United States Patent
Moros Ortiz et al.

(10) Patent No.: US 11,423,183 B2
(45) Date of Patent: Aug. 23, 2022

(54) THERMAL IMAGING PROTECTION

(71) Applicant: International Business Machines Corporation, Armonk, NY (US)

(72) Inventors: Jorge Andres Moros Ortiz, Melbourne (AU); Julian De Hoog, Greensborough (AU); Fatemeh Jalali, Hawthorn East (AU); Minh Phong Chau, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/804,127

(22) Filed: Feb. 28, 2020

(65) Prior Publication Data

US 2021/0271779 A1   Sep. 2, 2021

(51) Int. Cl.
| | |
|---|---|
| *G06F 21/83* | (2013.01) |
| *G05B 15/02* | (2006.01) |
| *G01K 1/02* | (2021.01) |
| *G01K 13/00* | (2021.01) |
| *G01K 7/22* | (2006.01) |
| *G06F 21/32* | (2013.01) |

(52) U.S. Cl.
CPC ............ *G06F 21/83* (2013.01); *G01K 1/026* (2013.01); *G01K 7/22* (2013.01); *G01K 13/00* (2013.01); *G05B 15/02* (2013.01); *G06F 21/32* (2013.01)

(58) Field of Classification Search
CPC ........... G06F 21/83; G06F 21/32; G01K 7/22; G01K 13/00; G01K 1/026; G05B 15/02
See application file for complete search history.

(56) References Cited

U.S. PATENT DOCUMENTS

| | | | |
|---|---|---|---|
| 8,468,598 B2 | 6/2013 | Hebert | |
| 9,515,831 B2 | 12/2016 | Lu et al. | |
| 9,992,193 B2 | 6/2018 | Lee | |
| 10,282,560 B2 | 5/2019 | Murray | |

(Continued)

OTHER PUBLICATIONS

Kaczmarek et al., "Thermanator: Thermal Residue-Based Post Factum Attacks on Keyboard Password Entry," arxiv:1806.10189v2 [cs.CR] Jul. 10, 2018, 12 pages.

(Continued)

*Primary Examiner* — Nader Bolourchi
(74) *Attorney, Agent, or Firm* — Patterson + Sheridan, LLP

(57) ABSTRACT

Thermal imaging protection is provided by, in response to detecting input of an access code on an input device: identifying a sequence comprising the access code; generating a bait code based on the sequence; and outputting a heat signature corresponding to the bait code using heating elements, such as resistor arrays, included in the input device. In some embodiments protection includes measuring temperatures of contact surfaces of the input device where the access code has been input; and adjusting a heat level of the heating elements based on the temperatures measured. Protection is further provided by storing the bait code; and in response to receiving entry of the bait code, activating unauthorized access countermeasures. In some embodiments protection includes, in response to detecting subsequent input of the access code: generating a second, different, bait code based on the sequence; and activating the heating elements based on the second bait code.

20 Claims, 27 Drawing Sheets

(56) References Cited

U.S. PATENT DOCUMENTS

| | | | |
|---|---|---|---|
| 10,386,798 | B2 | 8/2019 | Sioquim et al. |
| 10,409,406 | B2 | 9/2019 | Hajimusa et al. |
| 2005/0183072 | A1* | 8/2005 | Horning ................ G06F 21/125 717/140 |
| 2010/0017879 | A1* | 1/2010 | Kuegler .................. G06F 21/14 726/23 |
| 2016/0188855 | A1 | 6/2016 | Bezjian et al. |
| 2016/0364572 | A1 | 12/2016 | Cohen |
| 2017/0024574 | A1 | 1/2017 | Agrawal et al. |
| 2017/0103632 | A1 | 4/2017 | Tolle |
| 2017/0249450 | A1 | 8/2017 | Lawrenson et al. |
| 2019/0258795 | A1 | 8/2019 | Park |

OTHER PUBLICATIONS

Mowery et al.; "Heat of the Moment: Characterizing the Efficacy of Thermal Camera- Based Attacks", WOOT'11: Proceedings of the 5th USENIX conference on Offensive technologies, Aug. 2011, pp. 6.

Teddy Seyed, Xing-Dong Yang, Anthony Tang, Saul Greenberg, Jiawei Gu, et al.. CipherCard: A Token-Based Approach Against Camera-Based Shoulder Surfing Attacks on Common Touchscreen Devices. 15th Human-Computer Interaction (INTERACT), Sep. 2015.

Wodo, Wojciech & Hanzlik, Lucjan. (2016). Thermal Imaging Attacks on Keypad Security Systems. 458-464 10.5220/005998404580464.

Abdelrahman, Yomna & Khamis, Mohamed & Schneega, Stefan & Alt, Florian. (2017) Stay Cool! Understanding Thermal Attacks on Mobile-based User Authentication. 10.1145/3025453.3025461.

Michal Zalweski, "Cracking safes with thermal imaging," Accessed Online Feb. 27, 2020 [http://lcamtuf.coredump.cx/tsafe/].

* cited by examiner

THERMAL IMAGING PROTECTION

BACKGROUND

The present invention relates to thermal imaging, and more specifically, to protecting various systems against the use of thermal imaging. Thermal imaging cameras detect infrared light and make that light visible to the human eye via a displayed thermogram or heat print, which allows users to identify items or surfaces that are warmer than the surrounding areas. High quality thermal cameras are becoming increasing available to the general public, and although there are many legitimate benefits to thermal cameras, the widespread use of thermal cameras can also introduce new security risks when used by malicious parties.

SUMMARY

According to one embodiment of the present disclosure, a method for thermal imaging protection is provided, the method comprising, in response to detecting input of an access code on an input device: identifying a sequence comprising the access code; generating a bait code based on the sequence; and outputting a heat signature corresponding to the bait code using heating elements included in the input device, advantageously providing users with an energy efficient way to secure entry of access codes against observation by malicious parties.

In various embodiments, in combination with any example method above or below, the heating elements include resistor arrays arranged with contact surfaces of the input device, advantageously providing a reliable, scalable, and controllable manner of outputting the heat signature.

In various embodiments, in combination with any example method above or below, the method includes: measuring temperatures of contact surfaces of the input device where the access code has been input; and outputting the heat signature via the heating elements further comprises: adjusting a heat level of the heating elements based on the temperatures measured, advantageously better matching the simulated heat signature with the residual heat signature and thereby improving security.

In various embodiments, in combination with any example method above or below, the input device includes a keypad, wherein the sequence includes a first series of key selections, and wherein the bait code includes a second series of key selections different from the first series of key selections, advantageously allowing users to input the access code via a keypad and/or keyboard with protection against malicious parties using thermal imaging to learn the access code. In some such embodiments, the first series of key selections includes at least one key selection shared with the second series of key selections, advantageously inducing greater confusion in a malicious party as to the nature of the correct access code. In some such embodiments, a given key selected to comprise the second series of key selections is selected at least in part based on a distance of a corresponding key of the first series of key selection on the keypad related to the given key, advantageously inducing greater confusion in a malicious party as to the nature of the correct access code.

In various embodiments, in combination with any example method above or below, the input device includes a touchscreen, wherein the sequence includes a first security pattern, and wherein the bait code includes a second security pattern different from the first security pattern, advantageously allowing users to input the access code via a touchscreen with protection against malicious parties using thermal imaging to learn the access code.

In various embodiments, in combination with any example method above or below, the input device includes a fingerprint scanner, wherein the sequence includes a first fingerprint, and wherein the bait code includes a second fingerprint different from the first fingerprint, advantageously allowing users to input the access code via a biometric authenticator with protection against malicious parties using thermal imaging to learn the access code.

In various embodiments, in combination with any example method above or below, the method includes: storing the bait code for a predefined amount of time; and in response to receiving entry of the bait code, activating an unauthorized access countermeasure, advantageously countering a malicious party who observed the user input the access code. In some such embodiments, the unauthorized access countermeasure includes at least one of: granting access to a honeypot account; activating a camera associated with the input device; and transmitting a security alert, advantageously helping administers learn more about and/or identify the malicious party.

In various embodiments, in combination with any example method above or below, the method includes, in response to detecting subsequent input of the access code on the input device: generating a second bait code based on the sequence, wherein the second bait code is different from the bait code; and activating the heating elements included in the input device based on the second bait code, advantageously protecting against statistical analysis of multiple entries of the access code.

In various embodiments, in combination with any example method above or below, the sequence is received over a period of time, wherein the heat signature is output in response to the period of time concluding, and wherein the heating elements output multiple different heat levels based on the sequence and the period of time, advantageously inducing greater confusion in a malicious party as to the nature of the correct access code when the heat signature is output in response to the conclusion of entering the access code.

In various embodiments, in combination with any example method above or below, the sequence is received over a period of time, wherein outputting the heat signature sequentially activates the heating elements during the period of time, advantageously inducing greater confusion in a malicious party as to the nature of the correct access code when the heat signature is output in parallel with entry of the access code.

In various embodiments, in combination with any example method above or below, the bait code is a wash pattern applied to all of the heating elements of the input device, advantageously protecting against statistical analysis of multiple entries of the access code.

In various embodiments, in combination with any example method above or below, the sequence includes inputs to a modifier key and the bait code excludes corresponding simulated inputs to the modifier key, advantageously inducing greater confusion in a malicious party as to the nature of the correct access code.

In various embodiments, in combination with any example method above or below, the method includes: generating a second bait code based on the sequence; and outputting a second heat signature corresponding to the second bait code via the heating elements included in the input device concurrently with outputting the heat signature, advantageously inducing greater confusion in a malicious party as to the nature of the correct access code.

According to one embodiment of the present disclosure, a system for thermal imaging protection is provided, the system including: a contact surface; a plurality of heating elements disposed at a plurality of locations relative to the contact surface; and a heater controller, including: a processor; and a memory storage device including instructions that when executed by the processor, enable the heater controller to: detect input of an access code on the contact surface: identify a sequence comprising the access code; generate a bait code based on the sequence; and output a heat signature corresponding to the bait code to the contact surface via the plurality of heating elements, advantageously providing users with an energy efficient way to secure entry of access codes against observation by malicious parties.

In various embodiments, in combination with any example system above or below, the system includes: a plurality of thermistors disposed at a second plurality of locations relative to the contact surface; and the instructions, when executed by the processor, further enable the heater controller to: measure temperatures of the contact surface at the second plurality of locations; correlate input of the sequence to a subset of the second plurality of locations; and adjust a heat level of the plurality of heating elements based on the temperatures measured and correlated to the subset of the second plurality of locations, advantageously inducing greater confusion in a malicious party as to the nature of the correct access code.

In various embodiments, in combination with any example system above or below, the contact surface includes at least one of: a button face; a touchscreen; and a fingerprint scanner; and the sequence includes at least one of: a series of button actuations; a security pattern; and a fingerprint, advantageously allowing users to tailor the heat signatures to the input devices and access codes used, thus inducing greater confusion in a malicious party as to the nature of the correct access code.

According to one embodiment of the present disclosure, a computer-readable storage medium having computer-readable program code embodied therewith, the computer-readable program code executable by one or more computer processors to provide for thermal imaging protection is provided to enable the one or more processors to: detect input of an access code on an input device; identify a sequence comprising the access code; generate a bait code based on the sequence; and output a heat signature corresponding to the bait code via heating elements included in the input device, advantageously providing users with an energy efficient way to secure entry of access codes against observation by malicious parties.

DETAILED DESCRIPTION

Figure 1:
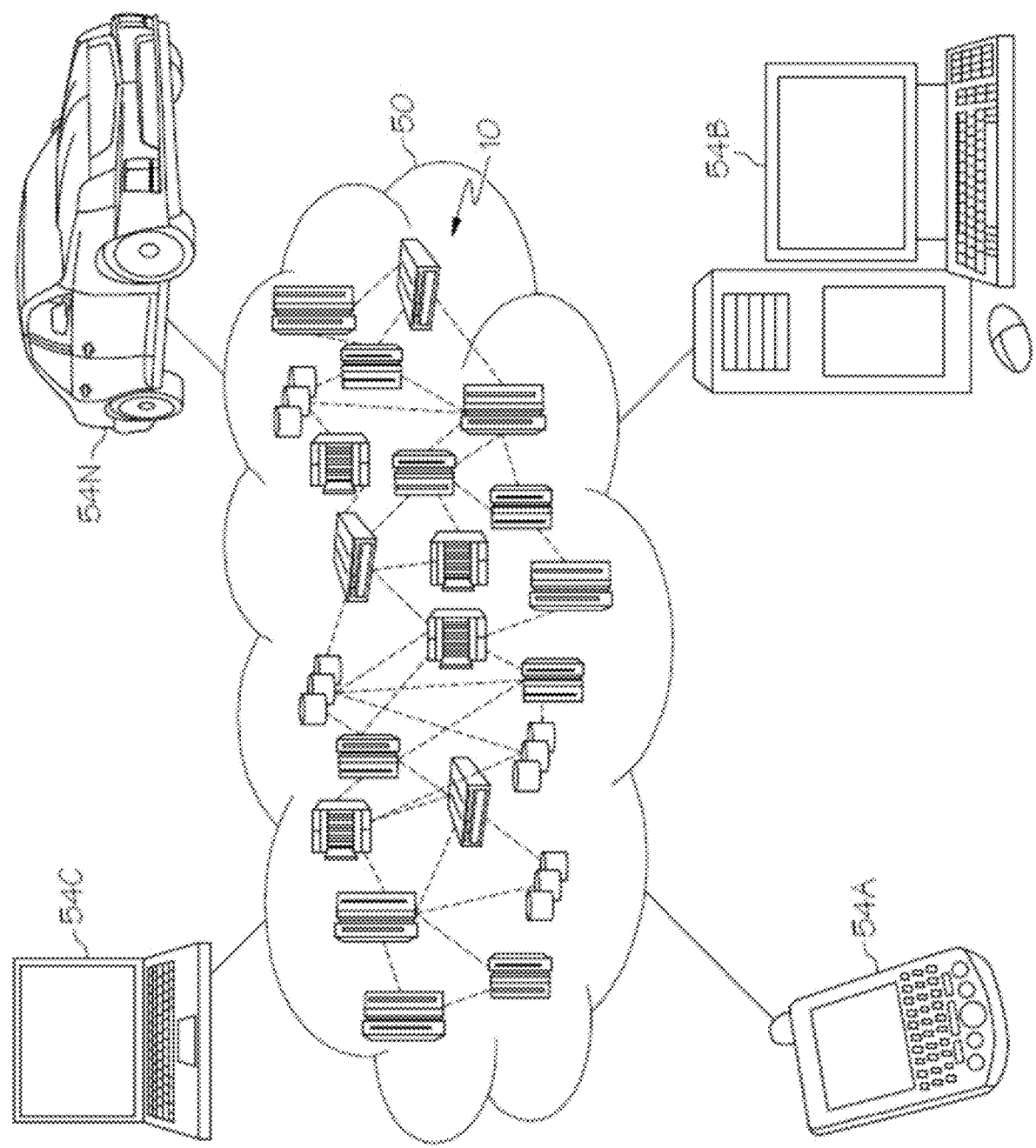
FIG. 1 depicts a cloud computing environment, according to embodiments of the present disclosure.

Thermal imaging allows users to see how hot (or cold) an object is, allowing for the comparison between two or more objects to identify the relative temperatures of the objects. Various systems use access control credentials (e.g., passwords, security patterns, fingerprints) that are input manually, and that result in the transfer of heat from the inputting user to the input device, which can allow a malicious party to see, via thermal imaging, the access control credentials as a residual heat pattern on the input device (e.g., a keyboard, keypad, touchscreen, biometric authenticator). To prevent a malicious party from learning the access credentials via thermal imaging, the present disclosure controls an input device to deploy a bait code in addition to and in conjunction with the access code input by a user. The bait code is output to the input device to create a false heat residue to obfuscate the actual access code input by a legitimate user, and guard against malicious parties observing the heat prints on the input device. In some embodiments, the bait code is paired with the input device (or underlying system) to invoke various unauthorized access countermeasures (e.g., logging into a honeypot account, activating cameras, generating an alert) to further protect against unauthorized access by malicious parties.

Although the examples given herein are presented primarily in relation to protecting against the unauthorized observation of access codes via thermal imaging, the present disclosure can also improve privacy during normal use of various computing devices. For example, in a voting machine, a user may wish to keep entry of the individual vote selections private by use of a bait code in addition to or independently of gaining access to the system via an access code. In a further example, in a testing facility, a user or proctor may wish to keep the entry of answers to various questions private to avoid cheating, releasing sensitive information, or the like, in addition to or independently of granting access to the system via an access code. Accordingly, at least some of the examples given herein related to access codes may also be understood to apply to operational data input.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
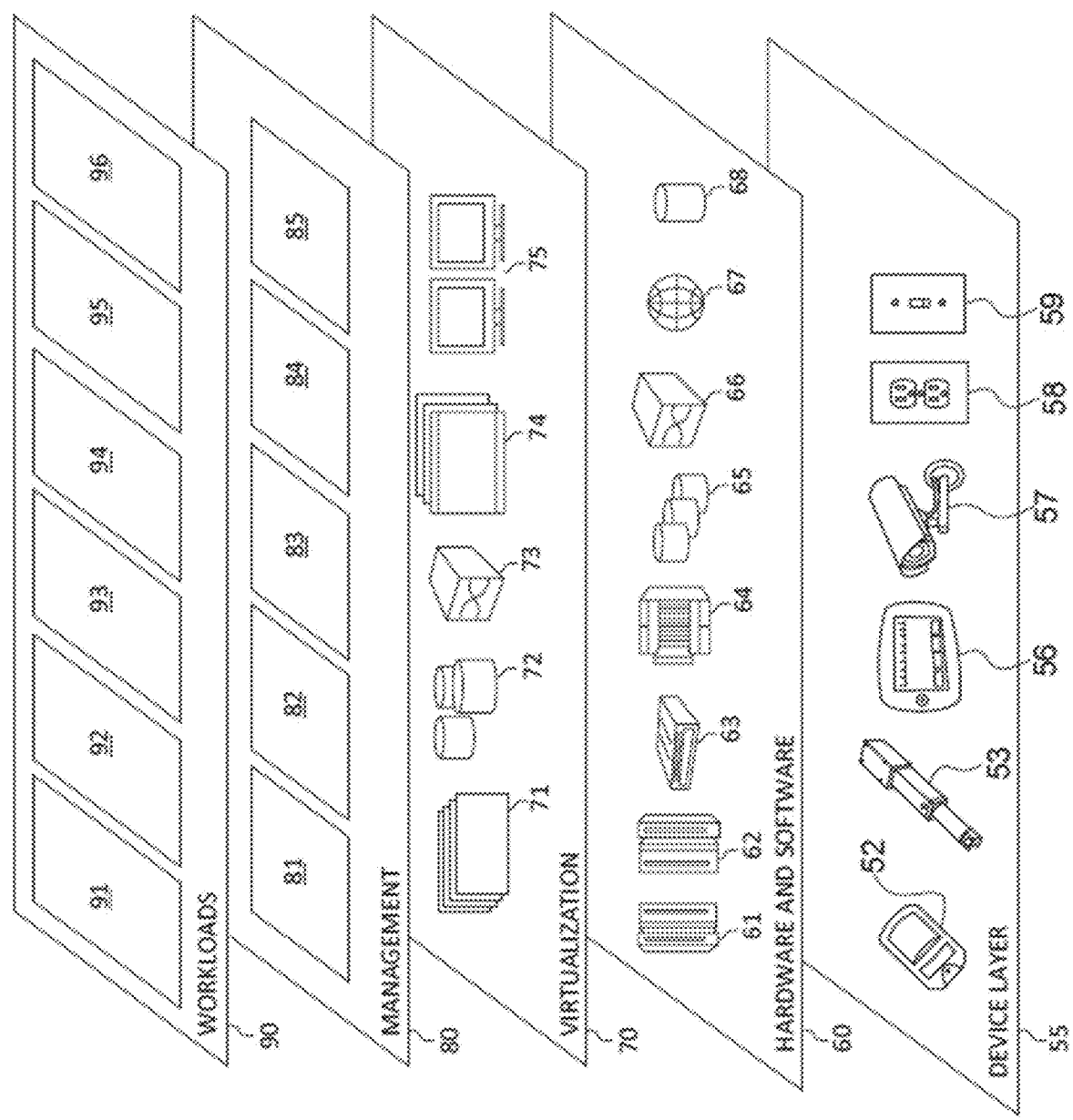
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

FIGS. 3A-3F illustrate various input devices 300*a-f* (generally, input device 300), according to embodiments of the present disclosure. As will be appreciated, the input devices 300 are provided as non-limiting examples to describe operation of the inventive concept described herein, and other input devices 300 with different configurations or arrangements are contemplated by the present disclosure.

Figure 3A:
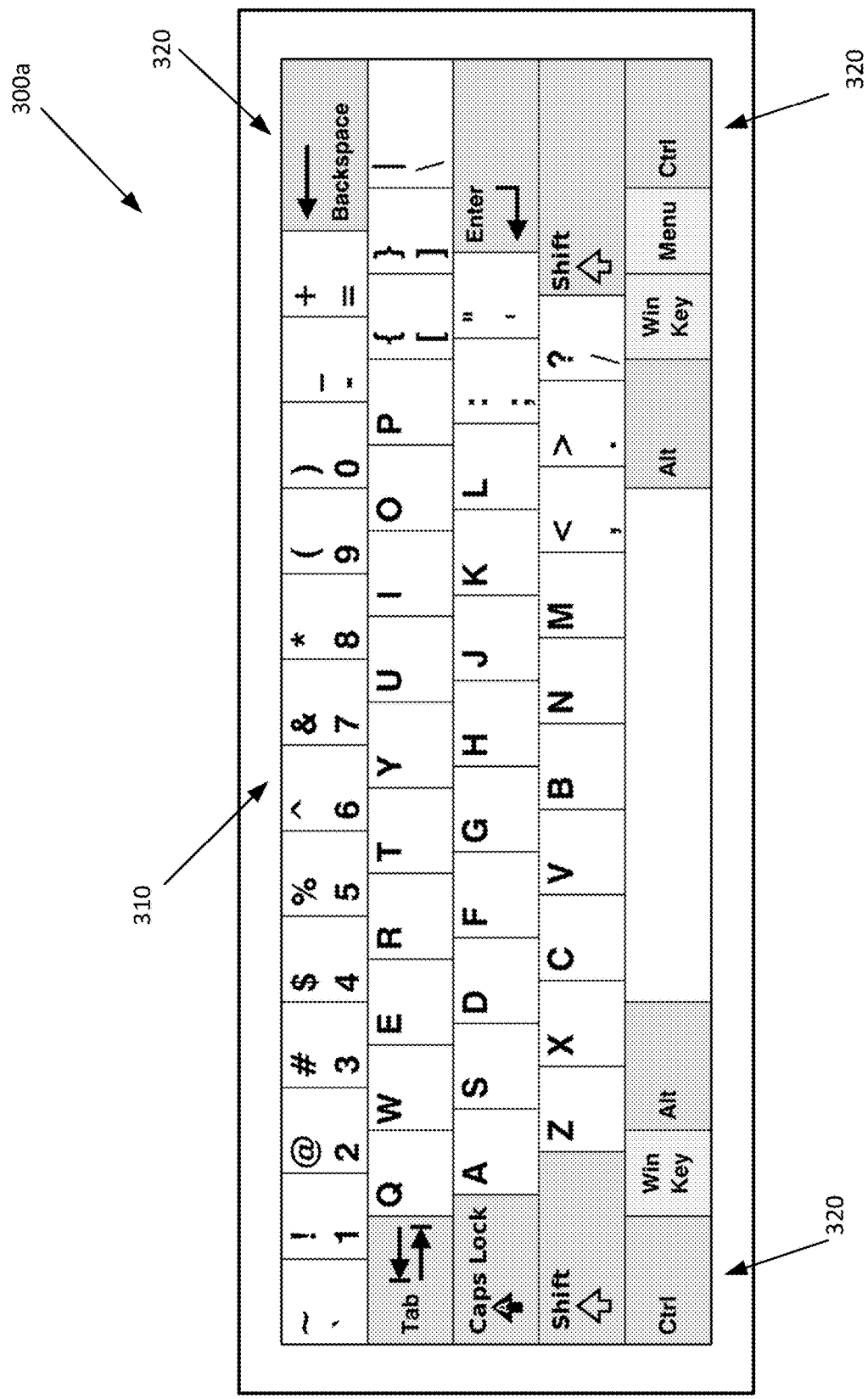
FIGS. 3A-3F illustrate various input devices, according to embodiments of the present disclosure.
Figure 3B:
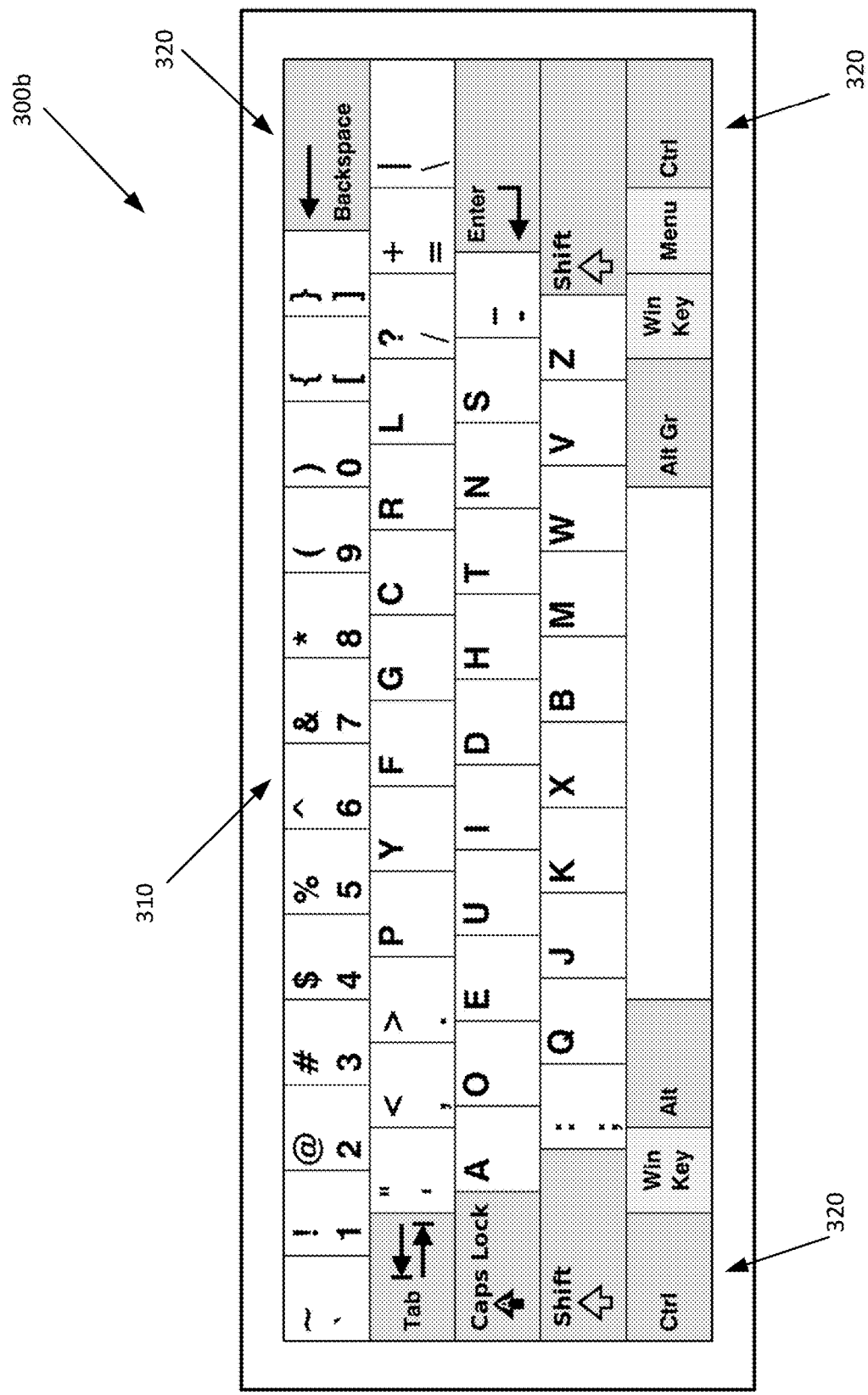
Figure 3C:
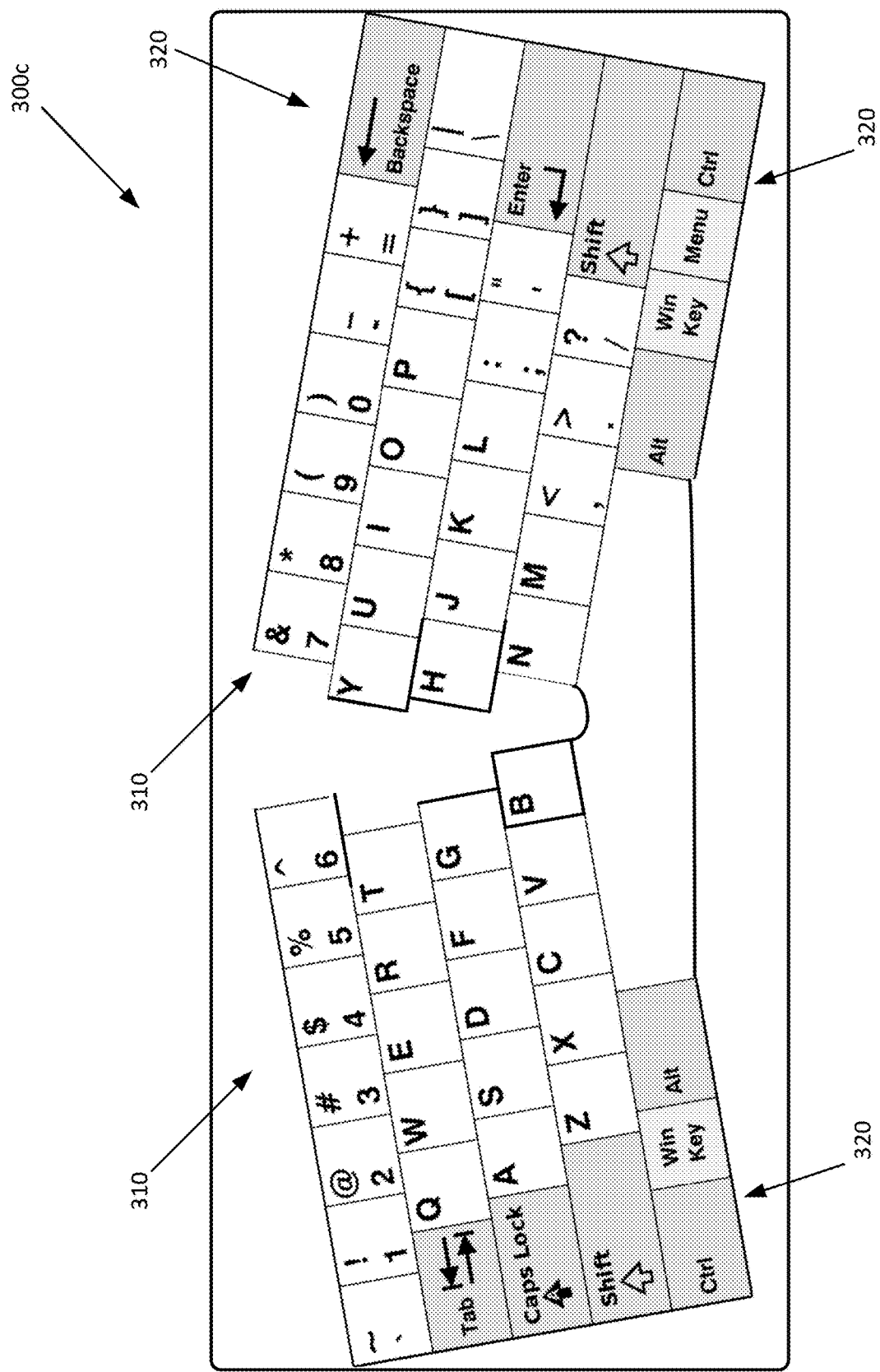

FIG. 3A illustrates a first input device 300*a* of a keyboard having a QWERTY layout. FIG. 3B illustrates a second input device 300*b* of a keyboard having a Dvorak layout. FIG. 3C illustrates a third input device 300*c* of a keyboard having an ergonomic QWERTY layout. Each of the keyboards may be integrated as an input device 300 to a computing device (e.g., as a laptop keyboard) or may be a separate peripheral device connected to a computing device (e.g., as a USB keyboard, a wireless keyboard) from which the computing device receives inputs as part of a login or credentialing operation. In some embodiments, the keyboards transfer physical input to a software-defined field for inspection or manipulation by a user before receiving a finalization or acceptance command from the user (e.g., via selection of an Enter key on the keyboard, via selection of a software defined Accept button via a mouse device).

The keyboards include a plurality of input keys 310, which are physically manipulated to receive input from a user. The input keys 310 may produce one or more characters in various fields that are defined in software running on the computing device (e.g., a password field), and may be affected by various modifier keys 320. As used herein, an input key 310 produces the input of a character, whereas a modifier key 320 modifies the (current or previous) input of a character received from an input key 310. For example, when the input key 310 marked with Q is depressed, a software field may receive input of "q," whereas when the input key 310 marked with Q is depressed in conjunction with the modifier key 320 marked with Shift, a software field may receive input of "Q". Input keys 310 include: alphabetic, numeric, character, punctuation, symbol keys, etc. Modifier keys 320 include: Shift, Caps Lock, Tab, Control (Ctrl), Alternative (Alt), Enter, Return, Backspace, Delete, Insert, Home, End, Page Up, Page Down, function keys, etc.

Figure 3D:
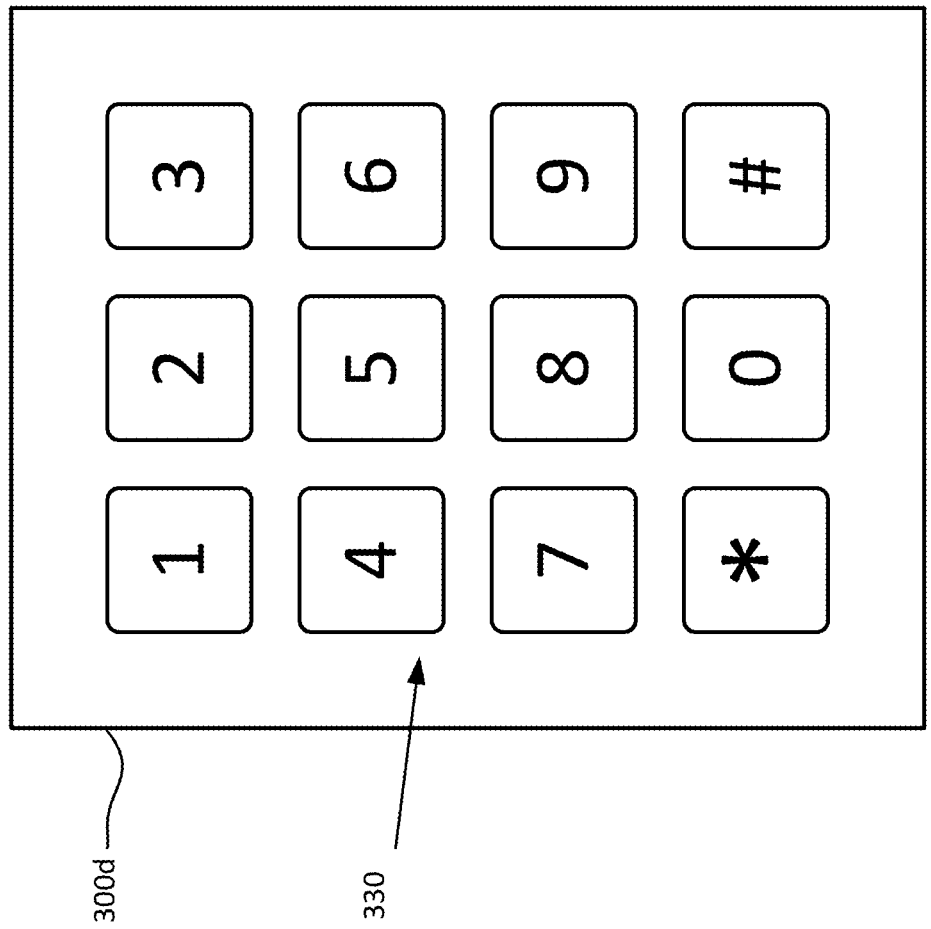

FIG. 3D illustrates a fourth input device 300*d* of a keypad. A keypad may be included in computing devices for PIN (Personal Identification Number) entry, phone number input, specialized numeric entry (e.g., as a portion of a keyboard), lock activation/deactivation, etc. Various devices such as, for example, ATMs (Automatic Teller Machines), credit card scanners, lock mechanisms (e.g., for electronic safes, access-restricted doors), telephones, remote controls, etc., may include a keypad instead of or in addition to a keyboard. Although illustrated as a numeric keypad, the buttons on keypads may include various different types of characters. Additionally, more or fewer buttons 330 may be included in a keypad than are illustrated in FIG. 3D.

In various embodiments, the keypad operates similarly to a keyboard; transferring physical input to a software-defined field for inspection or manipulation by a user before entry. For example, as the user depresses or actuates the various buttons 330 on the keypad, a display screen may show which buttons 330 registered as being pressed or actuated, and a user may select further buttons 330 for additional input, to reset the entry or delete a previously entered character from the sequence (e.g., on an error detected by the user), or direct finalization and acceptance of the sequence.

In other embodiments, the fourth input device 300*d* stores the input sequence in memory as the user selects the various buttons 330 on the keypad, and operates without the ability for a user to inspect or manipulate the input sequence without restarting the code entry. For example, a user may input the access code of 1-2-3-4 in sequence to a keypad and gain access to a protected device or system on successful input of the access code. However, if the user inputs the access code incorrectly (e.g., as 1-2-5), the user may have to complete entry of the erroneous code to gain a second attempt to input the correct access code (e.g., 1-2-5-3 followed by access denial and then input of 1-2-3-4 for access grant), or input a reset command (e.g., 1-2-5 followed by #-#-#-# and then input of 1-2-3-4 for access grant). A reset command is provided in some embodiments to avoid a denial of access (and the associated security lockouts, delays of re-attempting code input, etc.) when the user recognizes that the input code has been miss-entered.

As the various firmware and software interacting the physical hardware of a keypad can alter how inputs from the various buttons 330 are interpreted (e.g., whether the button marked # is used to signal entry acceptance or as part of a reset command), the various buttons 330 may be classified as input keys 310 or modifier keys 320 differently in different embodiments. Additionally, the buttons 330 can include various inputs unrelated to the entry of an access code (e.g., a "call attendant" button 330 on a gas station terminal).

Figure 3E:
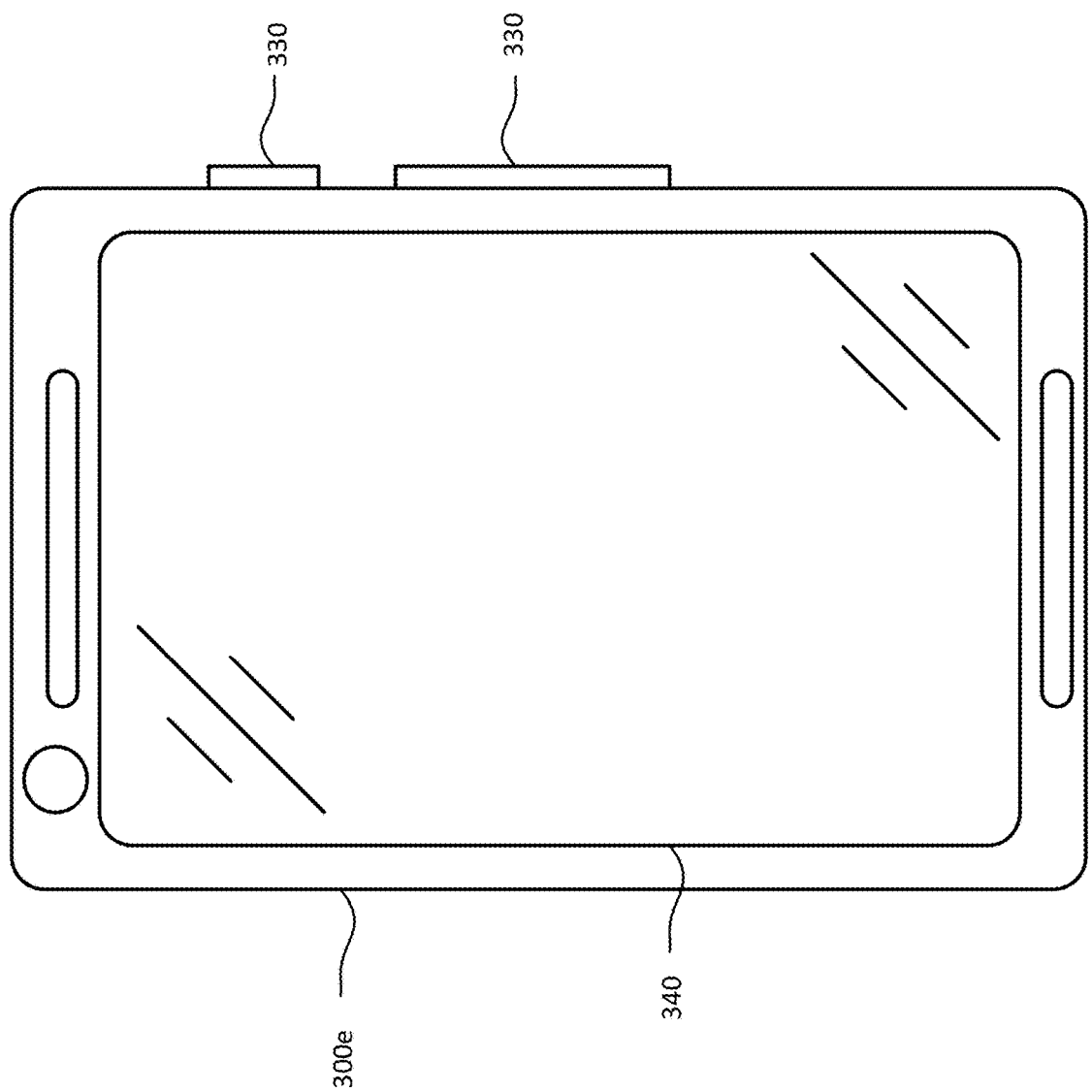

FIG. 3E illustrates a fifth input device 300*e* of a touchscreen. Touchscreens can be included in various devices, such as, for example, smart phones, tablets, vehicle entertainment systems, voting machines, etc. Touchscreen input and output devices operate a visual display in conjunction with a touch detection interface 340. The touch detection interface 340 may include various technologies (e.g., resistive, capacitive, surface wave, etc.) to detect where (and optionally how hard) a user has made contact with the touchscreen, and the visual display can display various keypads, keyboards, or patterns for the user to target inputs to. For example, a touchscreen may display any keyboard or keypad layout where specific regions of the touchscreen are correlated to individual software-define buttons or software-defined keys so that when the touch detection interface 340 detects an input at coordinate X-Y, the touchscreen accepts entry of the software-defined button/key output at coordinate X-Y. In a further example, the visual display may output a grid of M×N points (e.g., a 3×4 grid) to aid the user in drawing a pattern used to gain access to the device including the touchscreen.

Figure 3F:
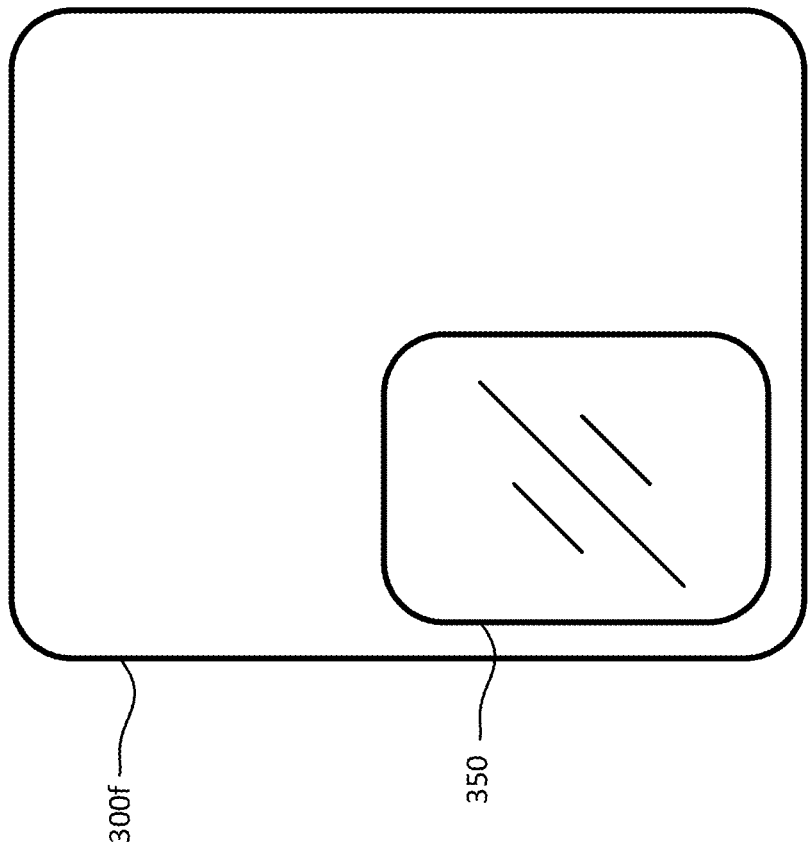

FIG. 3F illustrates a sixth input device 300*f* of a biometric authenticator. Biometric authenticators include a scanner 350 that use the physical appearance of (at least a portion of) a user's body to grant or deny access (e.g., fingerprint scanners, palm scanner, vein scanners, etc.). For example, a user may present a finger to a fingerprint scanner for the fingerprint scanner to obtain the user's fingerprint for use as an access code (e.g., if the presented fingerprint matches a known fingerprint, grant access). A user presents the examined body part (e.g., given finger, palm, sole, wrist, ear, etc.) to a scanner 350 of the biometric authenticator, which can use various scanning technologies to examine biometric features of the examined body part. Scanning technologies can include optical scanners that take a visual image of the biometric features using a digital camera, capacitive scanners, that use an electrical current (measured via changes in capacitance) to form an image of the biometric features, ultrasound scanner, which use soundwaves to penetrate layers of skin to form an image of the biometric features, thermal scanners that sense temperature differences on the contact surface to form an image of the biometric features, etc. Biometric authenticators can be used in lock mechanisms (e.g., for electronic safes, access-restricted doors), smartphones, and other computing devices to measure various body features.

Figure 4A:
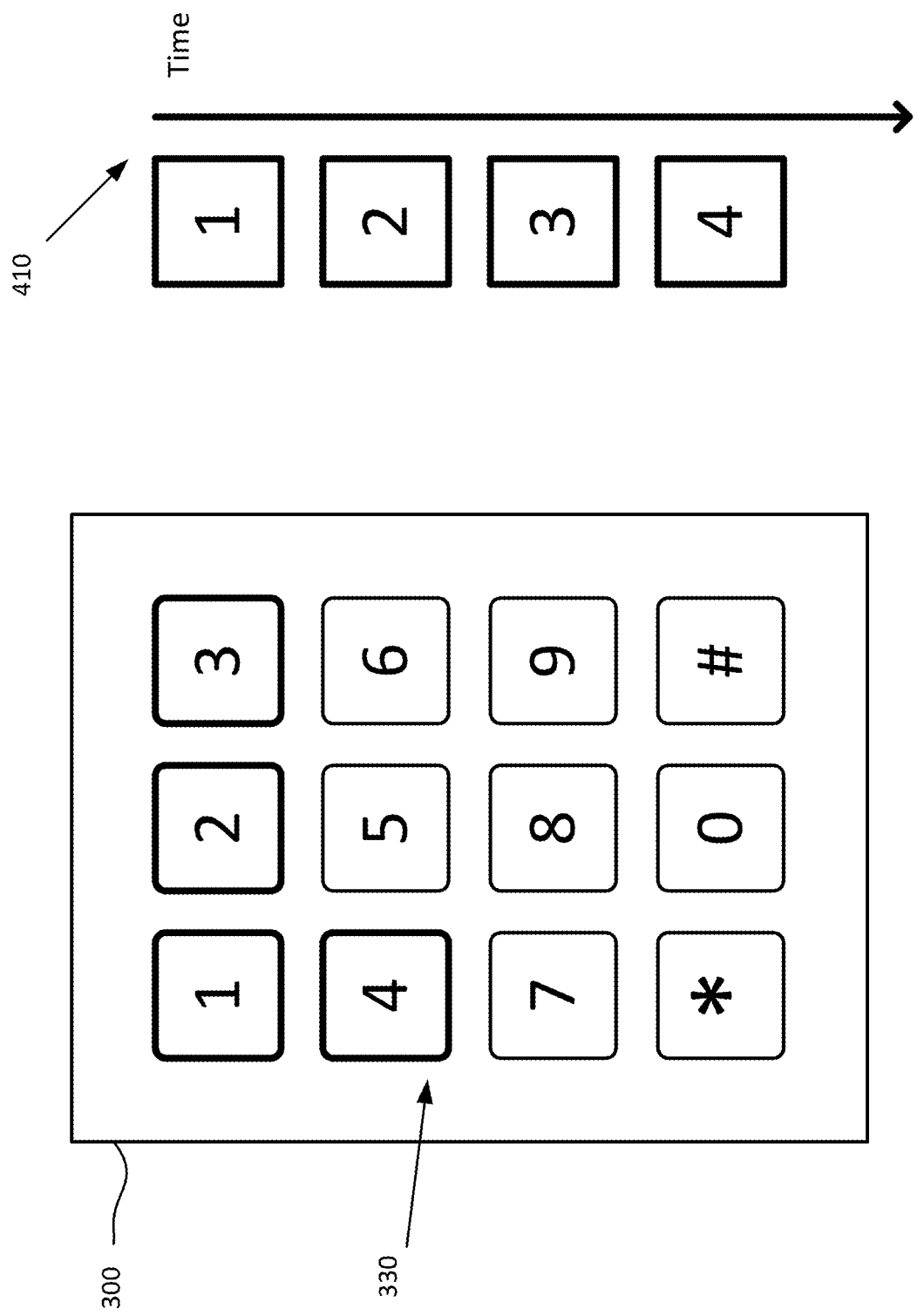
FIGS. 4A-4C illustrate the input of various sequences of various access codes via various input devices, according to embodiments of the present disclosure.
Figure 4B:
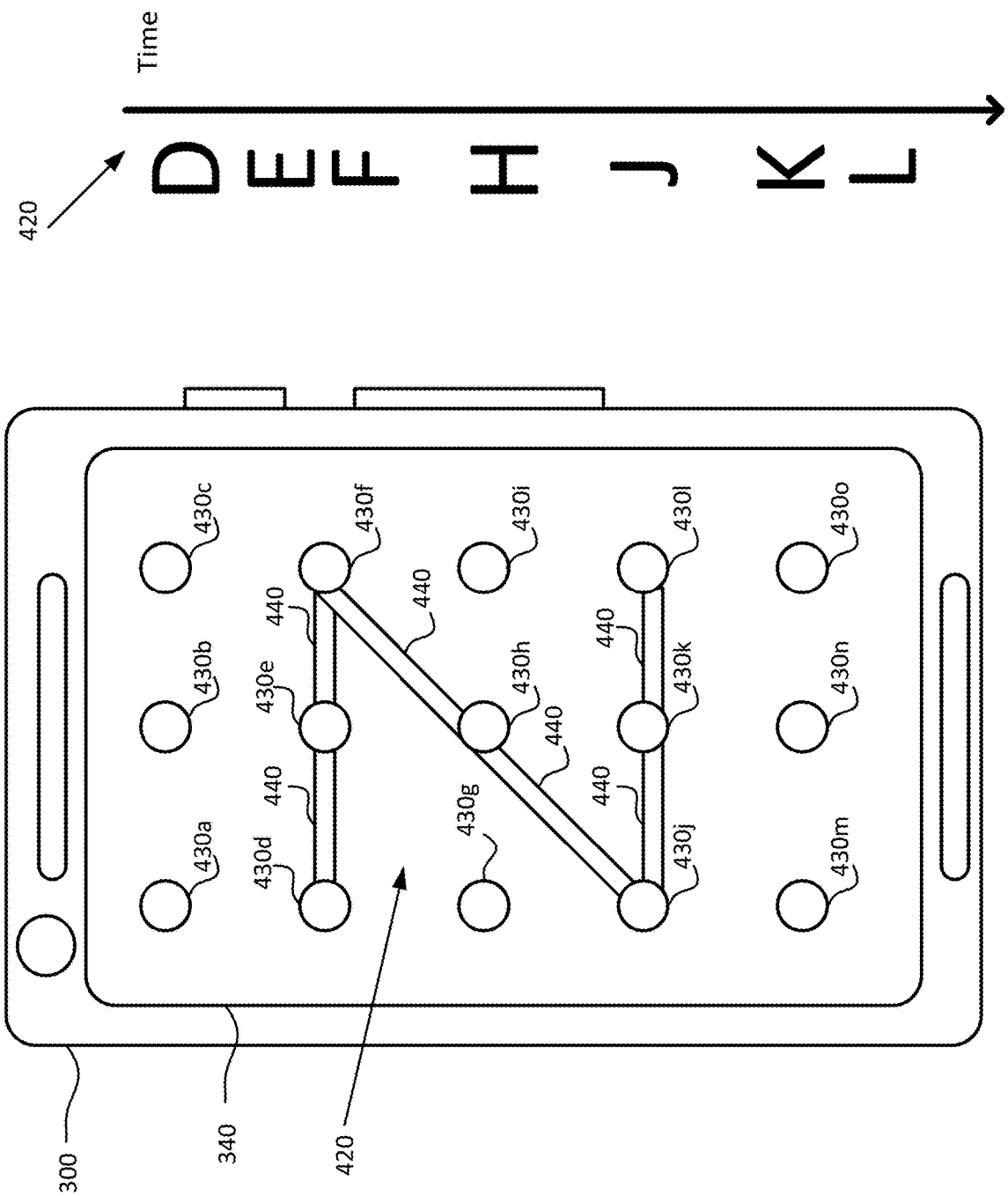
Figure 4C:
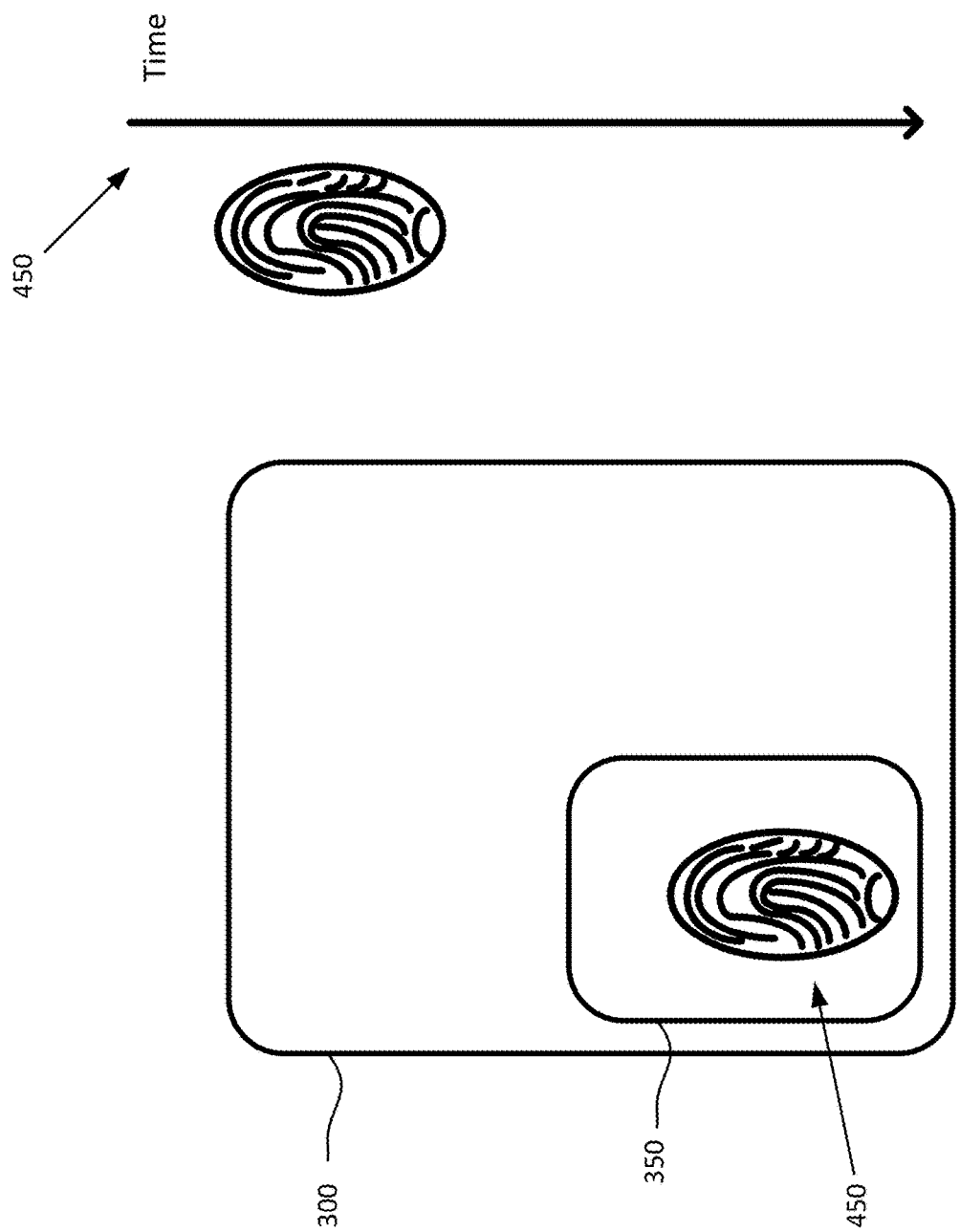

Each of the input devices 300 can receive input from a user, which imparts heat to various portions of the input devices 300 that a malicious party, using a thermal imager, could use to detect usage patterns of the user, including the input of various access codes. FIGS. 4A-4C illustrate the input of various sequences of various access codes via the various input devices 300, according to embodiments of the present disclosure.

FIG. 4A illustrates input of a key sequence 410 type access code in which a user selects one or more buttons 330 from a keypad or keyboard type input device 300 over a period of time. For example, if the user set the access code to 1-2-3-4 (e.g., for an electronic luggage lock, PIN, etc.) and inputs a key sequence 410 that inputs the values of 1, 2, 3, and 4 in the specified order, the access controlled system would grant the user access. If the user, however, input a different set of keys (e.g., 5-6-7-8), or input the same keys in a different order (e.g., 1-2-4-3), the access controlled system would deny the user access. Although illustrated as a sequence of four key inputs, the key sequence 410 may include more of fewer than four key inputs in other embodiments.

In some embodiments, the user may be required to input the key sequence 410 within a given time period or input the keys belonging to the sequence within a given time period of one another to avoid timing out or resetting the key sequence 410. For example, if the user were to input the key sequence of 1-2-3-4 with more than x seconds between the entry of 2 and the entry of 3, the input device 300 may interpret the key sequence 410 to be two entries—one of 1-2 and one of 3-4.

In some embodiments, the user may be required to input the key sequence 410 and indicate completion on the key sequence 410 to the access controlled device via a separate key or software-defined button. For example, after filling out a password field in a software application, the user may press the Enter key or click (via a mouse or touchscreen) a Login button, or advance to a next field (e.g., via a Tab key or mouse/touch selection) for further input.

In some embodiments, the access controlled system may grant alternative access for various sequences alternative or hard-defined sequences. For example, an ATM may grant access for withdrawals when the access code is input in reverse (e.g., as 4-3-2-1), but also places a distress call, when reverse entry of the access code is associated with a coerced withdrawal. In a further example, a smart phone may grant limited access to the operating system to dial emergency services when the input key sequence 410 matches an emergency services number (e.g., 911 in the United States, 999 in the United Kingdom, 112 in Australia). In various embodiments, the present disclosure is applied to generate a bait code for the alternative access codes, miss-entered access codes, and properly entered bait codes so as to not indicate an incorrect or alternative entry of an access code by omission of output of a bait code.

FIG. 4B illustrates input of a security pattern 420 type access code in which a user draws a pattern on a touchscreen type input device 300 over a period of time. For example, the user draws a "Z" pattern starting a point D 430*d* (generally, point 430) and concluding at point L 430*l* (including points 430*d-f*, 430*h*, and 430*j-1*). The touchscreen may display various regions associated with the available points 430*a-o* available for drawing a pattern to aid the user in inputting the pattern. The security pattern 420 allows the access controlled device to grant or deny access based on the shape and the location where the shape is located on the input device 300. For example, if the user were to input the same "Z" pattern at a different location (e.g., points 430*a-c*, 430*e*, and 430*g-i*) or a different pattern (e.g., a "U" pattern from points 430*d*, 430*g*, 430*j-1*, 430*i*, and 430*o*), the access controlled system would deny access to the user.

In addition to the points 430, the user contacts the touchscreen (e.g., via finger or stylus) at various inter-point spaces 440 between two points 430 along the pathway of the security pattern 420; affecting the temperature at locations beyond the points 430. Additionally, the user may dwell or spend different amounts of time in contact with various locations of the touchscreen, further affecting the temperatures at those locations. For example, a user drawing the "Z" pattern in FIG. 4B may spend more time at the vertex points of point 430*f* and 430*j* than the other points 430 (e.g., due to changing the direction of motion at those points 430), and thus impart more heat to the vertex points than the other regions of the touchscreen. Accordingly, the access controlled device may track the inter-point spaces 440 and dwell times when generating a bait pattern matched to the input of a security pattern 420.

In some embodiments, the user may be required to input the security pattern 420 within a given time period to avoid timing out or resetting the security pattern 420. For example, if the user were to begin to input the security pattern 420 and dwell for more than x seconds at a given point 430, the input device 300 may require the user to restart the security pattern 420.

In some embodiments, the user may be required to input the security pattern 420 in one motion without breaking contact with the touchscreen. For example, the input device 300 may interpret the user lifting a finger from the touchscreen to be a completion of the input or a command to accept the input as complete.

In some embodiments, the user may be required to input the security pattern 420 and indicate completion on the security pattern 420 to the access controlled device via a separate key or software-defined button. For example, after drawing the pattern, the user may press the Enter key or click (via a mouse or touchscreen) a Login button, or advance to a next field (e.g., via a Tab key or mouse/touch selection) for further input.

In a further example, when the user is using a slide-to-type interface on a software defined keyboard, the security pattern 420 may indicate a word or a character for use in a password field that the user selects for entry. For example, a user may draw a security pattern 420 that includes the letters C, A, and T, and then select the word "cat" for input into a password field. In a further example, a user may select several strokes or radicals to select an East Asian character from a set of candidate characters (e.g., selecting the 犭, 艹, and 田 radicals and then selecting the kanji character "猫" for cat).

In some embodiments, the access controlled system may grant alternative access for various alternative security patterns 420 or hard defined patterns. For example, a smart phone may grant access to answer an incoming call, or access to a camera (without granting full access to the operating system) via a swipe in a given direction. In a further example, a tablet may generate a security alert when the security pattern 420 is input in reverse from the correct access code. In various embodiments, the present disclosure is applied to generate a bait code for the alternative security patterns 420, miss-entered security patterns 420, and properly entered bait codes so as to not indicate an incorrect or alternative entry of an access code by omission of output of a bait code.

FIG. 4C illustrates input of a biometric pattern 450 type access code in which a user places a finger for biometric identification on a scanner 350. Although described in relation to a fingerprint biometric marker, one of skill in the art will appreciate that the use other biometric markers (palm prints, sole prints, ear patterns, vein patterns, etc.) are contemplated by the present disclosure. To supply the biometric pattern 450 for analysis, the user places the associated body part on the scanner 350, which detects the patterns present on the body part, and compares the patterns of the supplied body part against known patterns to determine whether to grant or deny access. Depending on how long the scanner 350 takes to analyze the biometric pattern 450, the user may impart various amounts of heat to the scanner 350, which a malicious party may attempt to retrieve to spoof the biometric pattern 450 and thereby gain unauthorized access to the controlled system.

In some embodiments, the access controlled system may grant alternative access for various alternative biometric patterns 450. For example, a fingerprint scanner may grant access when a right thumbprint is identified, but grant access and generate a silent alarm when a left thumbprint from the same person is identified. In some embodiments, the access controlled system may deny access when a correct biometric pattern 450 is supplied, but in an unscannable format. For example, a user may miss-orient a finger for scanning, have debris on the supplied finger (e.g., oil, dirt, dust), not press the finger firmly enough onto the scanner 350, etc. so that the correct biometric pattern 450 is supplied, but is unscannable to grant access. In various embodiments, the present disclosure is applied to generate a bait code for the alternative biometric patterns 450, unscannable biometric patterns 450, and properly entered bait codes so as to not indicate an incorrect or alternative entry of an access code by omission of output of a bait code.

Figure 5A:
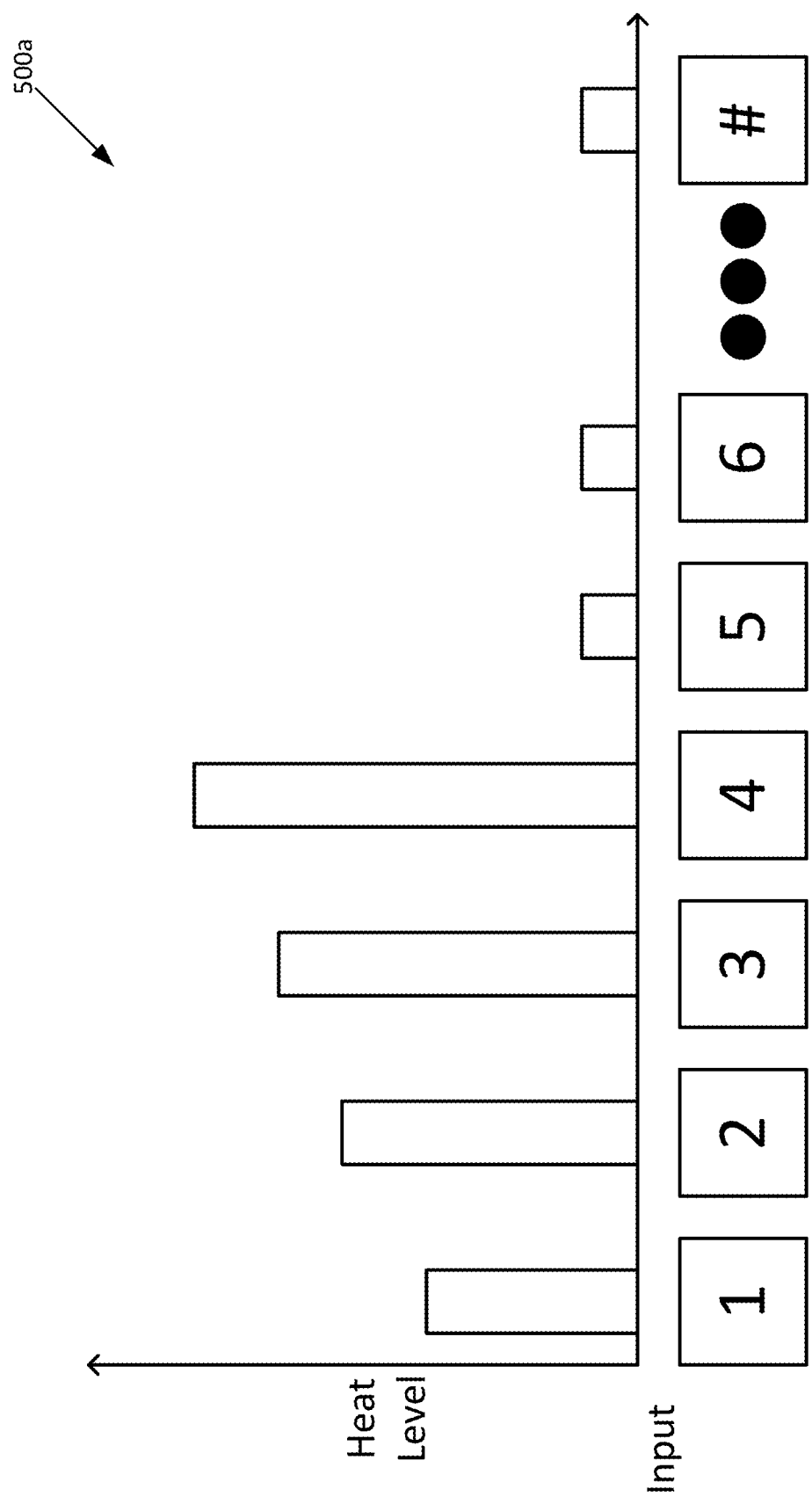
FIGS. 5A-5C illustrate various heat signatures from the input of an access code, according to embodiments of the present disclosure.
Figure 5B:
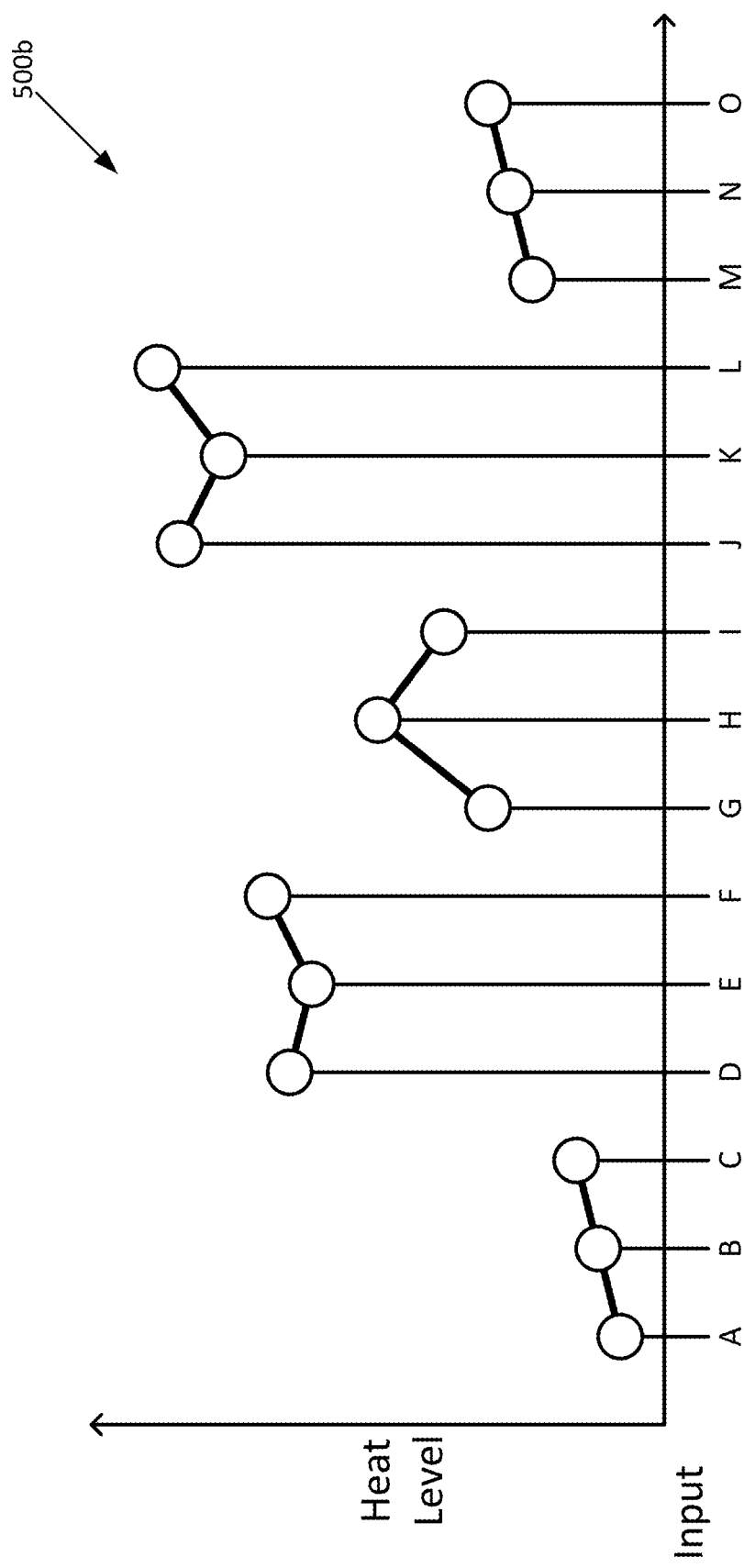
Figure 5C:
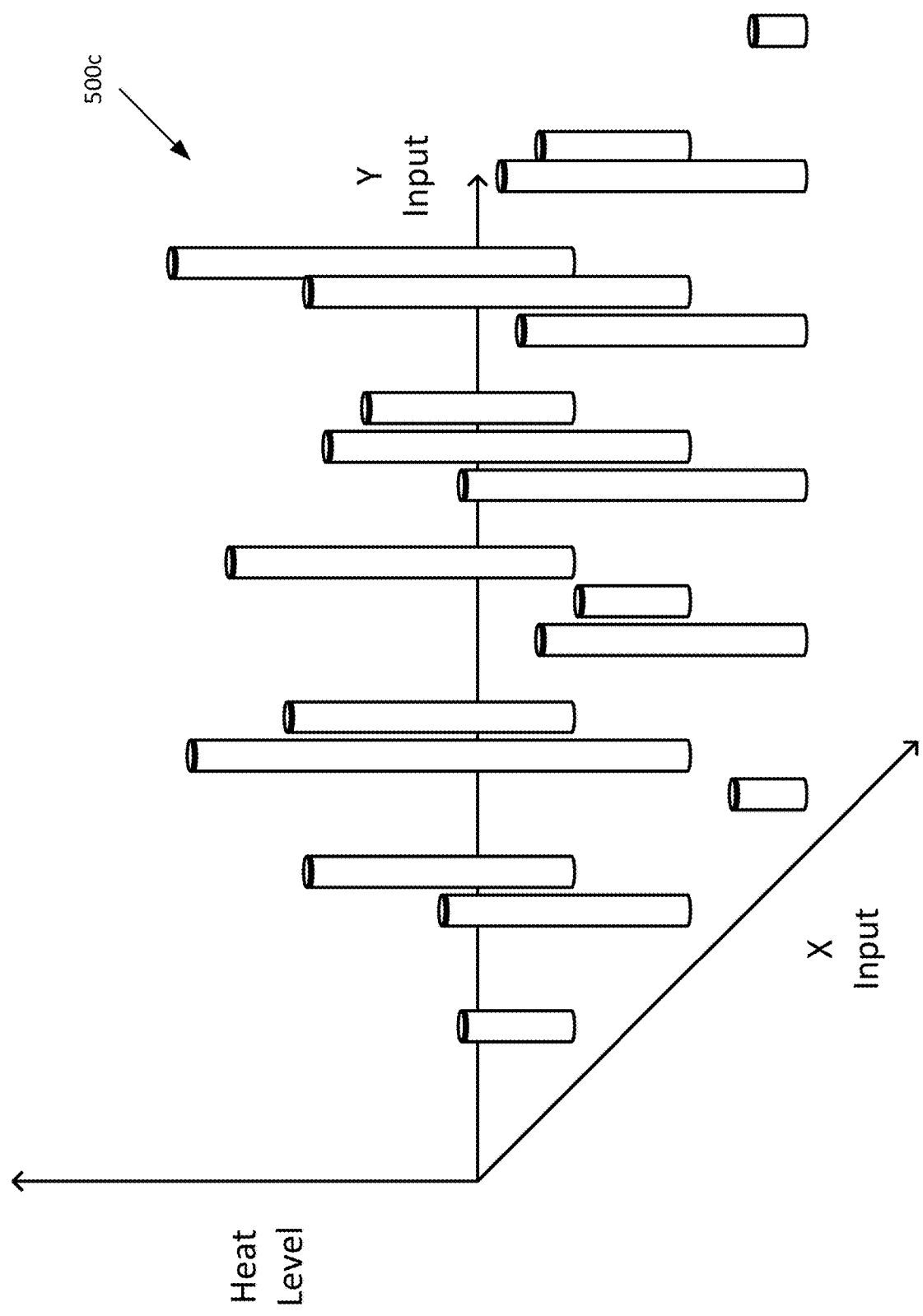

FIGS. 5A-5C illustrate various heat signatures 500a-c (generally, heat signature 500) from the input of an access code, according to embodiments of the present disclosure.

FIG. 5A illustrates a first heat signature 500a on a keypad type input device 300, where heat is measured on the various buttons 330 of the keypad. When the input sequence of 1-2-3-4 is applied to the buttons 330, the buttons 330 associated with those values receive heat from the user's fingers, and illustrate a higher temperature than buttons 330 that were not selected by the user. For example, a button 330 associated with the number 1 (which was selected for input of the sequence) appears warmer than a button 330 associated with the number 5 (which was not selected as part of the sequence). The unselected buttons 330 may have heat measured according to the background temperature, which is affected by ambient local atmospheric temperature and the operation of the input device (e.g., waste heat from a processor). Additionally, buttons 330 selected earlier in the sequence have time to dissipate the heat received from the user, and appear cooler than buttons 330 selected later in the sequence. Accordingly, a key sequence 410 may leave behind a heat signature 500 that a malicious party can use to reconstruct the key sequence 410 to attempt to gain unauthorized access to the controlled system.

FIG. 5B illustrates a second heat signature 500b on a touchscreen input device 300, where heat is measured at the various points 430 and some of the inter-point spaces 440 between two points 430. As will be appreciated, heat may be measured between any two adjacent points 430 along various pathways, and the temperatures may varying linearly or nonlinearly along a pathway depending on the amount of contact made by the user, dwell time of the user along the path, etc. For example, when applying the "Z" pattern as in FIG. 4B, the user may spend less time in contact with point E 430e than points D and F (430d and 430f), and thus point E 430e exhibits a lower temperature than either points D or F (430d and 430f). Similarly, because point F 430f was contacted more recently than point D 430d, even if the user spent the same amount of time contacting those points, point F 430f would exhibit more heat that point D 430d due to having less time to dissipate the heat. Additionally, heat transferred from the user to the input device 300 may spread to adjacent, non-contacted points over time and dissipate over time. For example, although the "Z" pattern in FIG. 4B does not contact points A-C 430a-c, heat transfer from the contacted points may affect the temperatures of non-contacted points 430 so that point C 430c, which is closer to the last-contacted point 430 of points D-F 430d-f is warmer than point A 430a, which is further from the last contacted point 430 of points D-F 430d-f. Accordingly, a security pattern 420 may leave behind a heat signature 500 that a malicious party can use to reconstruct the security pattern 420 to attempt to gain unauthorized access to the controlled system.

FIG. 5C illustrates a third heat signature 500c on a biometric authenticator, where heat is measured at various locations on the scanner 350. For example, a fingerprint may apply different amounts of heat to a contact surface at the ridges (versus the valleys) of the print, and closer to the pad of the finger than to a tip or joint of the finger. Accordingly, a fingerprint (or other biometric marker) may leave behind a heat signature 500 that a malicious party can use to reconstruct the biometric marker to attempt to gain unauthorized access to the controlled system.

FIGS. 6A-6F, 7A-7B, and 8 illustrate various bait codes 610a-f (generally, bait code 610) that are generated based on the characteristics of the access code input on a given input device 300. The bait codes 610 match the type of access code received by the input device 300, and mimic various aspects of the access code to thereby hide the true access code from malicious parties. For example, when the access code is entered as a key sequence, the bait code is generated and output to mimic a key sequence (e.g., as in FIGS. 6A-6F) similar to the actual key sequence, when the access code is entered as a security pattern, the bait code 610 is generated and output to mimic a security pattern similar to the actual security pattern, when the access code is entered as a biometric marker, the bait code 610 is generated and output to mimic a biometric marker similar to the actual biometric marker, etc. The bait code 610 is output by the input device 300 that receives user input (ideally of the access code, but potentially a miss-entered access code, or a bait code 610) by various heating elements to produce a heat signature 620 that mimics the heat residue left by the user making input to the input device 300, thus hiding, obscuring, or obfuscating what inputs the user made when the input device 300 is viewed by a thermal imager.

The bait codes 610 mimic the size, orientation, length, motions used therein to input the access codes (whether accepted by or rejected by the input device 300 or associated computing device) to further guard against a malicious party observing the user's hand motion (or the like) when entering the access code (e.g., observing entry of the access code to disregard some of the bait codes 610 or elements thereof as incongruent with entry of the access code). For example, a malicious party who sees a user input an access code with X key strokes only on the left half of a keyboard may disregard heat signatures on the right half of a keyboard as unrelated to the access code (e.g., from a bait code 610, from a different user, from non-access code usage, etc.). In another example, a malicious party who sees a user input a security sequence via strokes of a given direction may disregard heat signatures that could not be produced in a single fluid motion (i.e., without breaking contact from a contact surface) in those directions as unrelated to the access code. In a further example, a malicious party who sees the size of a user's hand or orientation thereof when supplying a biometric pattern may disregard heat signatures that are too large, too small, or in a different orientation than observed as unrelated to the access code. Accordingly, the bait codes 610 discussed herein are based on the access codes to thereby further confound potential malicious parties by providing heat signatures that cannot easily be disregarded or distinguished from the heat signatures of the actual access codes even with additional knowledge of how the access code was input.

FIGS. 6A-6F illustrate the application of various bait codes 610*a-c* to a key sequence type access code, according to embodiments of the present disclosure. FIGS. 6A-6F may be understood in conjunction with FIGS. 4A and 5A. The bait codes 610 are generated based on the characteristics of the access code input on the input device 300, and the corresponding heat signatures 620*a-c* (generally, heat signature 620) generated by the input device 300 serve to mask or obfuscate the heat signature of the key sequence 410 input by a user.

Figure 6A:
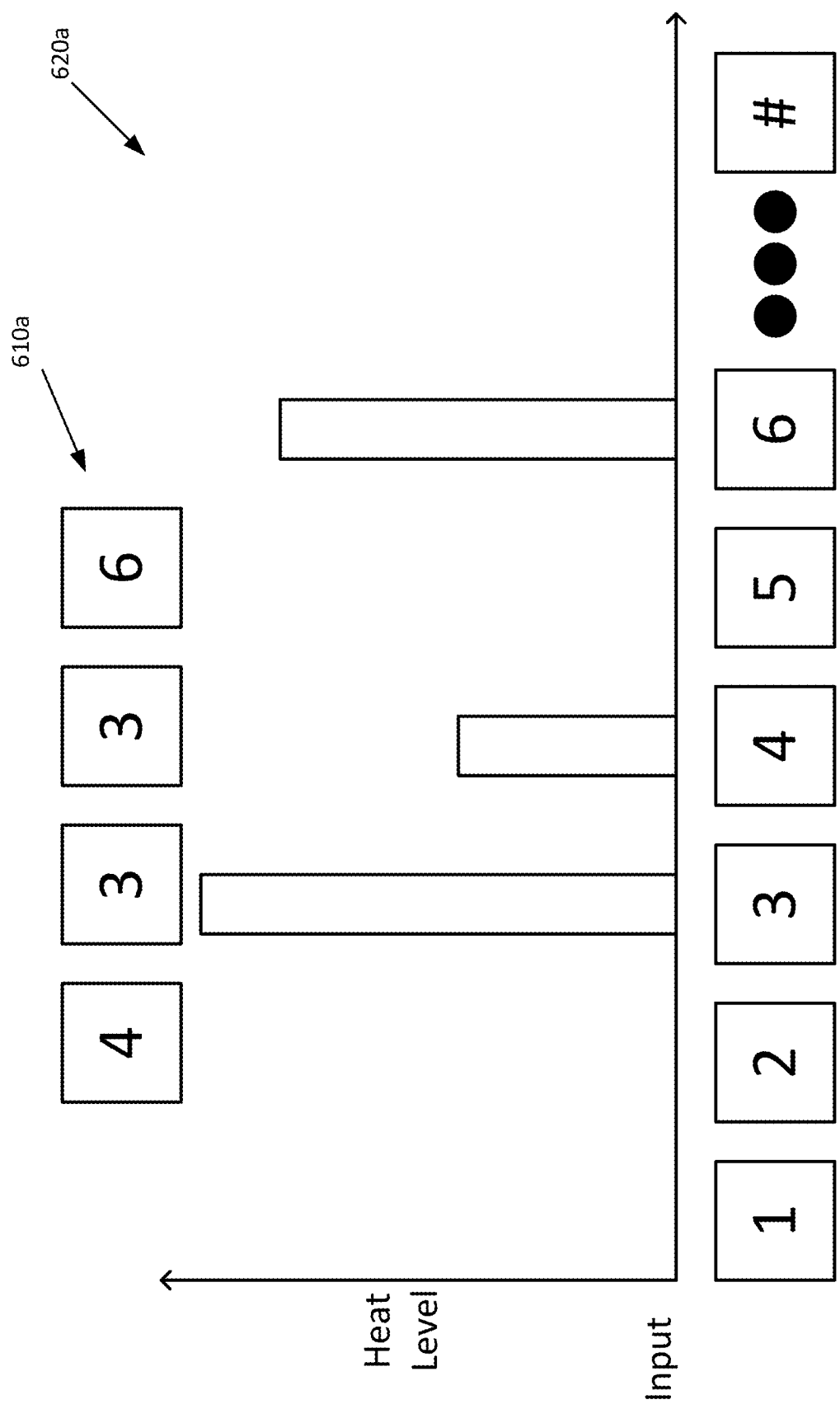
FIGS. 6A-6F illustrate the application of various bait codes to a key sequence type access code, according to embodiments of the present disclosure.
Figure 6B:
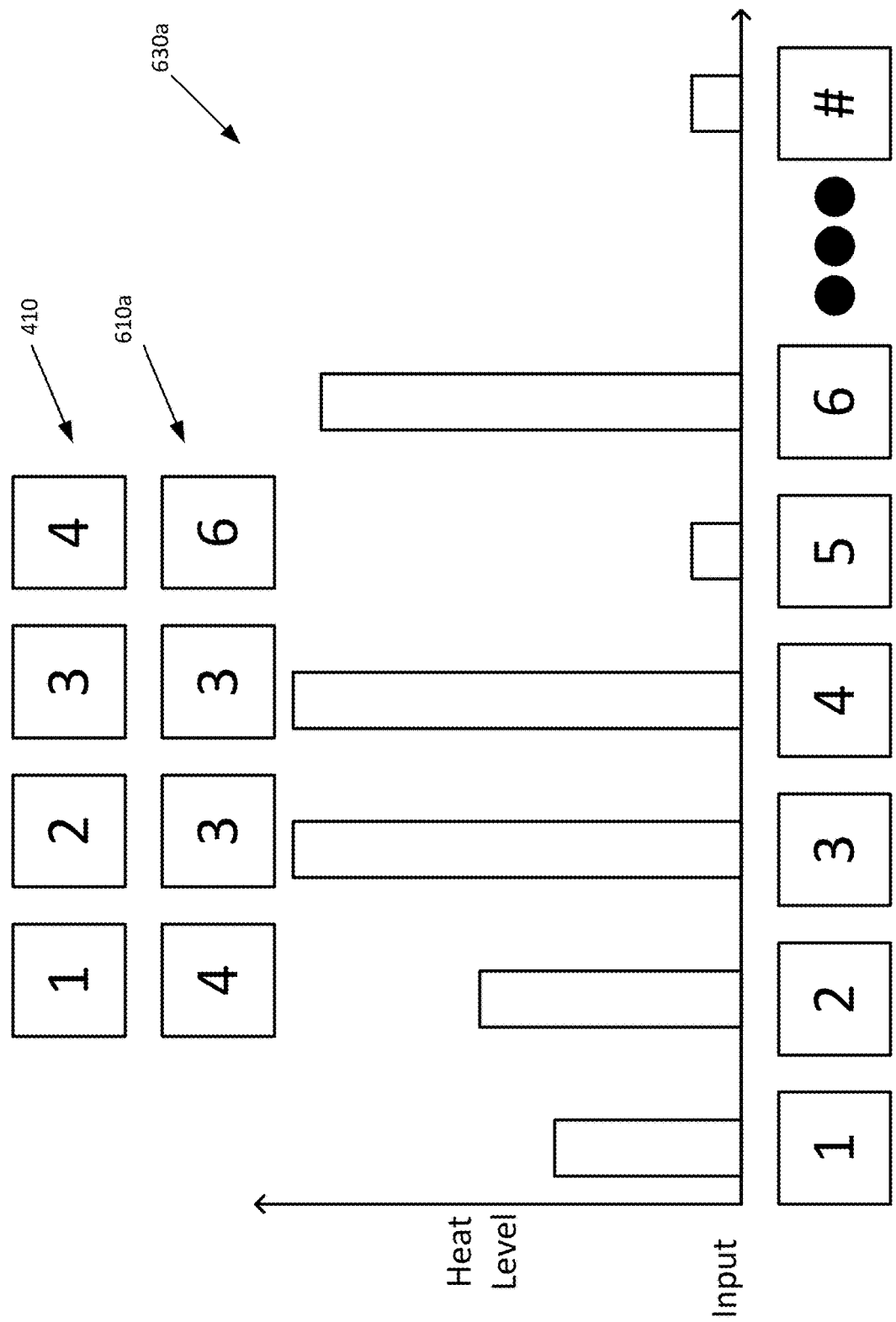

FIG. 6A illustrates a first bait code 610*a* based on the key sequence 410 input in FIG. 4A (i.e., 1-2-3-4) and a first heat signature 620*a* of the first bait code 610*a* (i.e., 4-3-3-6). FIG. 6B illustrates a first obfuscated heat signature 630*a* of the first heat signature 620*a* (from FIG. 6A) overlaid with the first heat signature 500*a* (from FIG. 5A). The first bait code 610*a* includes the same number of characters as the access code (four in the present example), and the identities of those characters comprising the sequence of the first bait code 610*a* are based on the identities of the characters comprising the sequence of the key sequence 410 and the layout of the input device 300. In some embodiments, the identities of the keys selected to comprise a bait code 610 can include repeated characters (e.g., the two "3"s of the first bait code 610*a*). In some embodiments, the keys selected to comprise a bait code 610 can match corresponding keys in the key sequence (e.g., the third key in the first bait code 610*a* and in the key sequence 410 are both "3").

The bait code 610 is generated based on the layout of the input device 300, and is stored as a list of characters, which is independent of the layout of a particular input device 300 (e.g., a malicious party may observe a heat pattern of a first input device 300 and attempt to gain access on a second input device 300 using a different layout). For example, the number "4" which initiates the first bait code 610*a* may be selected based on the associated key or button being adjacent to or within a predefined range or distance of the key or button associated with the number 1 (which initiates the key sequence 410) when the input device 300 is a keypad. However, if the input device 300 used to receive entry of the key sequence 410 were a keyboard, the potential adjacent keys may include different characters than if a keypad were used. For example, a user inputting the access code on the keyboard shown in FIG. 3A would have the keys associated with the characters of """, "Q", and "2" adjacent to the "1" key (and may exclude the "Tab" key from consideration as being a modifier key 320), whereas a user inputting the access code on the keyboard shown in FIG. 3B would have the same keys considered to be adjacent (although those keys are associated with different characters representing different characters).

Entry of the bait code 610 on a different input device 300 would be monitored based whether the characters supplied match the bait code 610 and not whether the individual positions of the key selected match the positions of the keys originally selected on original input device 300 to the bait code 610. For example, the "Q" key is positioned adjacent to the "1" key on a QWERTY layout keyboard, but is located at least three keys away on a Dvorak layout keyboard, and a malicious party using a different layout of input device 300 than the bait code 610 was observed on may select a differently positioned hardware element to input the same character.

When the heat signature of the key sequence 410 (see, FIG. 4A) and the first heat signature 620*a* of the first bait code 610*a* (see, FIG. 6A) are viewed at the same time, a thermal imager would be presented with the obfuscated heat signature 630*a* illustrated in FIG. 6B. In various embodiments, the input device 300 outputs the first heat signature 620*a* during the input of the key sequence 410 so that at least some portions of the first heat signature 620*a* are output before the key sequence 410 is fully input (and a user presumably removes a hand from the input device). In some embodiments, the input device 300 outputs the bait code 610 sequentially (via heating elements) over a period of time while the user is attempting input of the access code so that if the malicious party observes partial input, the malicious party cannot determine whether the heat signature was made by the user or by the input device 300.

Figure 6C:
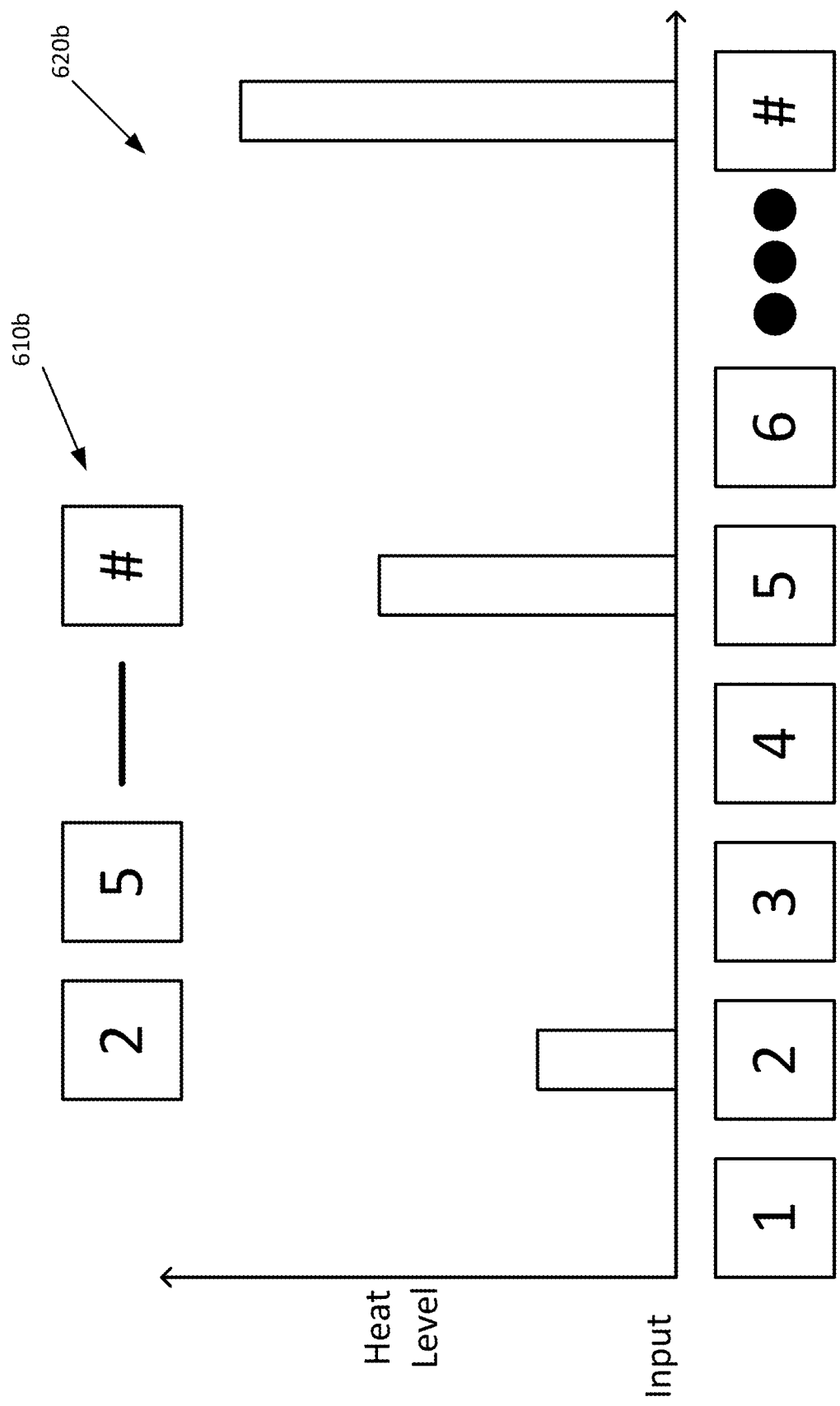
Figure 6D:
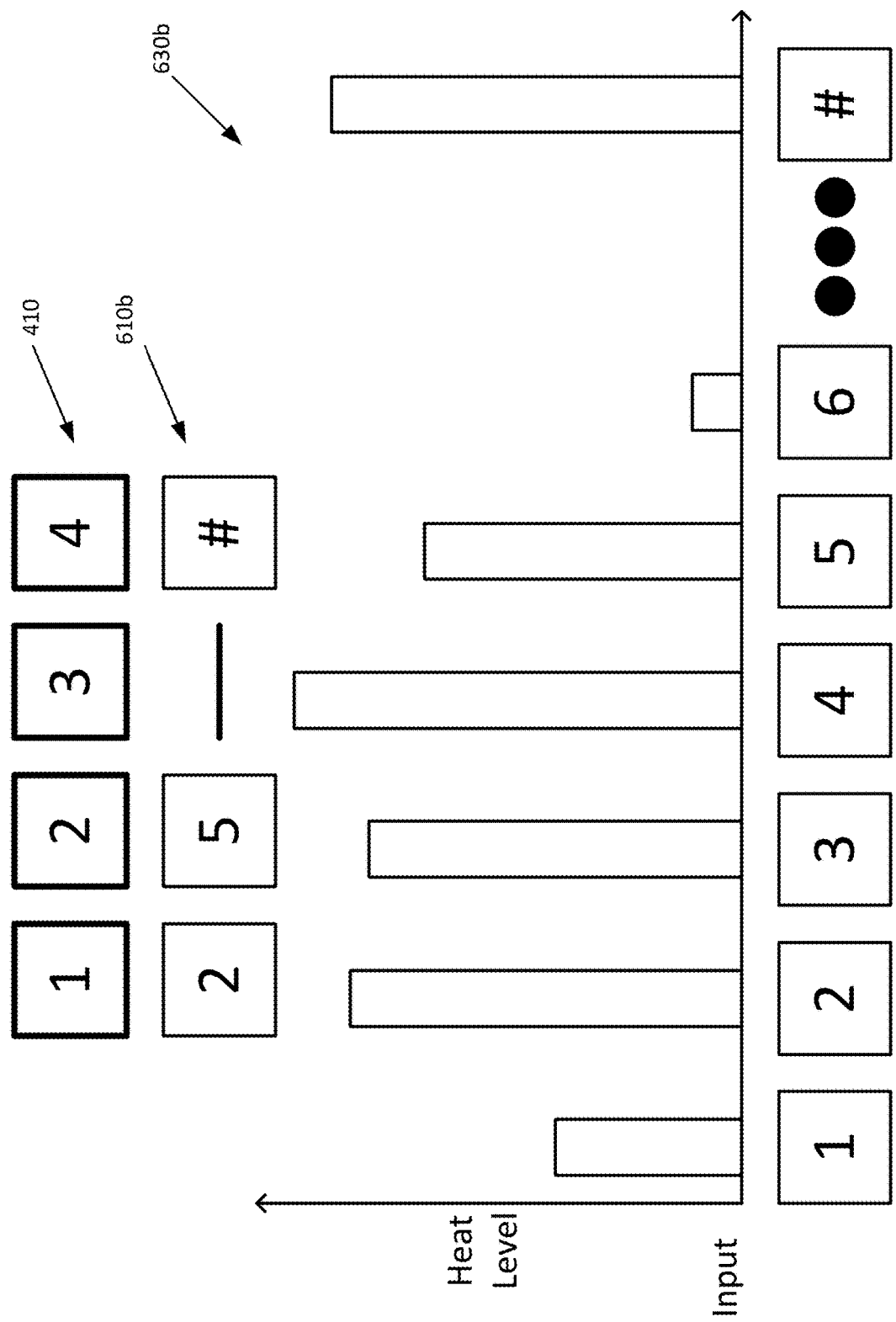

FIG. 6C illustrates a second bait code 610*b* based on the key sequence 410 input in FIG. 4A (i.e., 1-2-3-4) and a second heat signature 620*b* of the second bait code 610*b* (i.e., 2-5-null-#). FIG. 6D illustrates a second obfuscated heat signature 630*b* of the second heat signature 620*b* (from FIG. 6C) overlaid with the first heat signature 500*a* (from FIG. 5A). The second bait code 610*b* includes fewer characters than the access code (three versus four in the present example), and the identities of those characters comprising the sequence of the second bait code 610*b* are based on the identities of the characters comprising the sequence of the key sequence 410 and the layout of the input device 300.

In various embodiments, a "null" or no-selection of a key in a bait code 610 corresponding to a key in the key sequence 410 can provide additional security or account for additional processing time to generate the bait code 610. For example, a malicious party who does not know how many key strokes comprise a valid access code may be confused by seeing heat signatures corresponding to different lengths, or may misinterpret a relative order of the access code when attempting to interpret a combined heat signature with different lengths of access codes and bait codes 610. Similarly, a malicious party who does not know the number of key strokes comprising a valid access code may misinterpret the combined heat signature as including a repeated character when no such repetition (in the key sequence 410 and/or the bait code 610) exists.

When the heat signature of the key sequence 410 (see, FIG. 4A) and the second heat signature 620b of the second bait code 610b (see, FIG. 6C) are viewed at the same time, a thermal imager would be presented with the second obfuscated heat signature 630B illustrated in FIG. 6B. In various embodiments, the input device 300 outputs the second heat signature 620b during the input of the key sequence 410 so that at least some portions of the second heat signature 620b are output before the key sequence 410 is fully input (and a user presumably removes a hand from the input device). In some embodiments, the input device 300 outputs the bait code 610 sequentially over a period of time while the user is attempting input of the access code so that if the malicious party observes partial input, the malicious party cannot determine whether the heat signature was made by the user or by the input device 300.

Figure 6E:
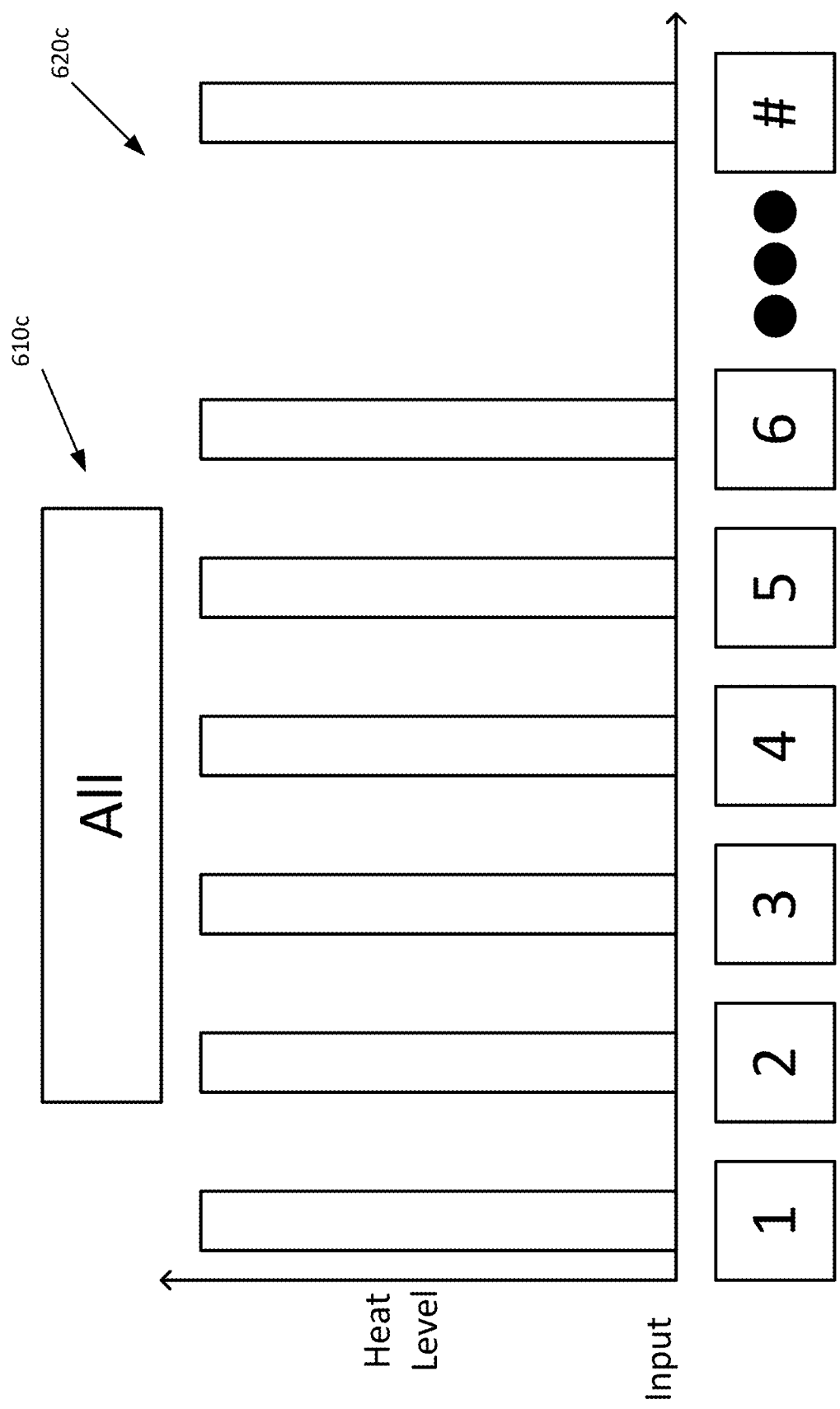
Figure 6F:
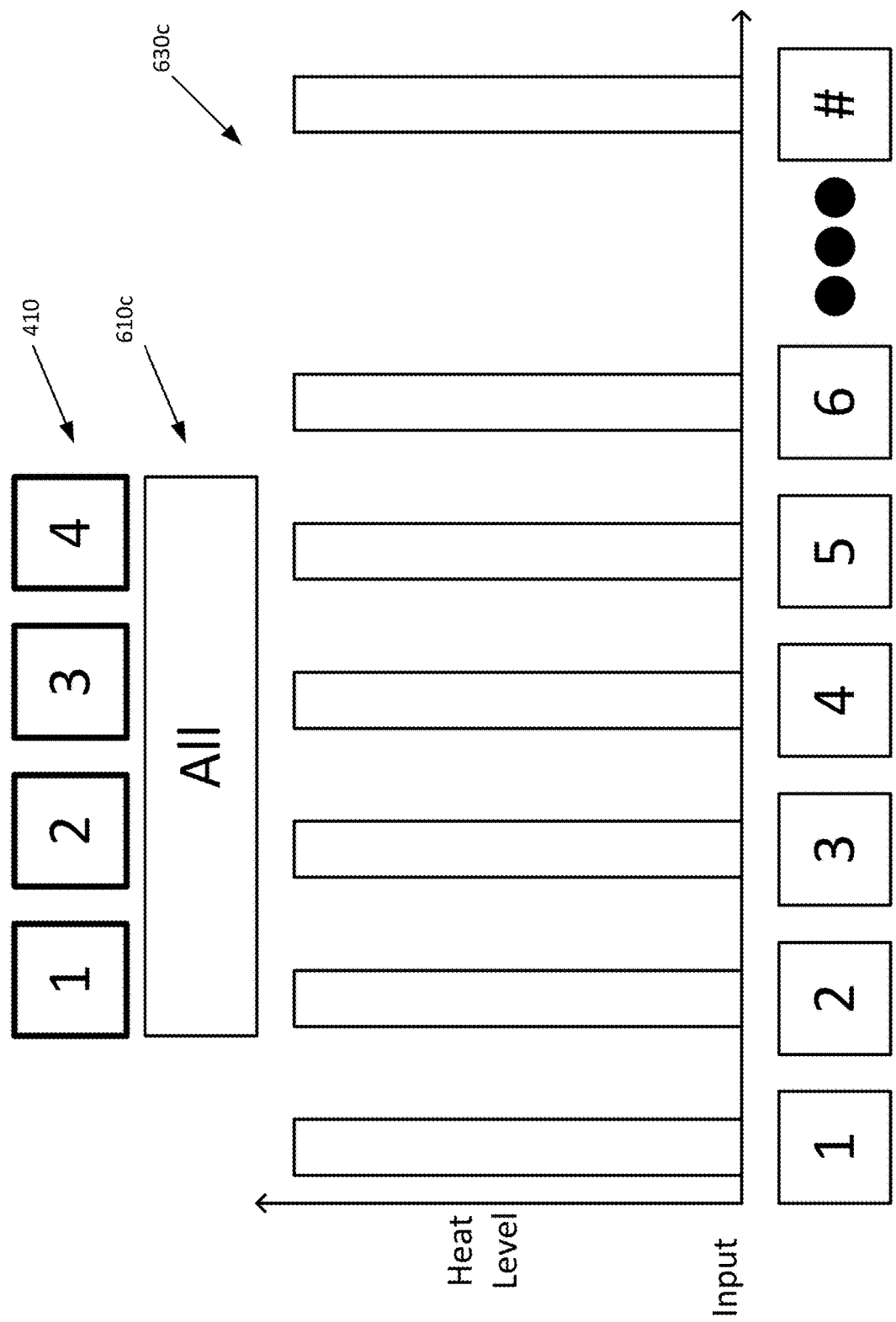

FIG. 6E illustrates a third bait code 610c of a wash code and a third heat signature 620c of the third bait code 610c. FIG. 6F illustrates a third obfuscated heat signature 630c of the third heat signature 620c (from FIG. 6E) overlaid with the first heat signature 500a (from FIG. 5A). A wash code, such as the third bait code 610c, affects all of the keys (or other contact surfaces) of the input device 300 to "wash out" the heat signature of the access code when input. In various embodiments, a wash code may be used when the input device 300 is in heavy use or relies on a single access code shared by multiple users that a malicious party could learn over a long period of time and multiple inputs of the access code. For example, the keypad for accessing a door in a building may have one access code shared among all of the occupants of the building. A wash code could therefore be used (at least during busy times, such as the start of the work day) to prevent a malicious party from using pattern analysis of several obfuscated heat signatures 630 to return the access code.

In various embodiments, the input device 300 outputs the third heat signature 620c during the input of the key sequence 410 so that the third heat signature 620c is output before the key sequence 410 is fully input (and a user presumably removes a hand from the input device). In some embodiments, the input device 300 outputs the third heat signature 620c during a predefined time period regardless of whether a user has input an access code. In some embodiments, the input device 300 outputs the third heat signature 620c in response to the user inputting an incorrect access code to prevent a malicious party from seeing two obfuscated heat signatures 630 that include some or all of a correct access code.

Figure 7A:
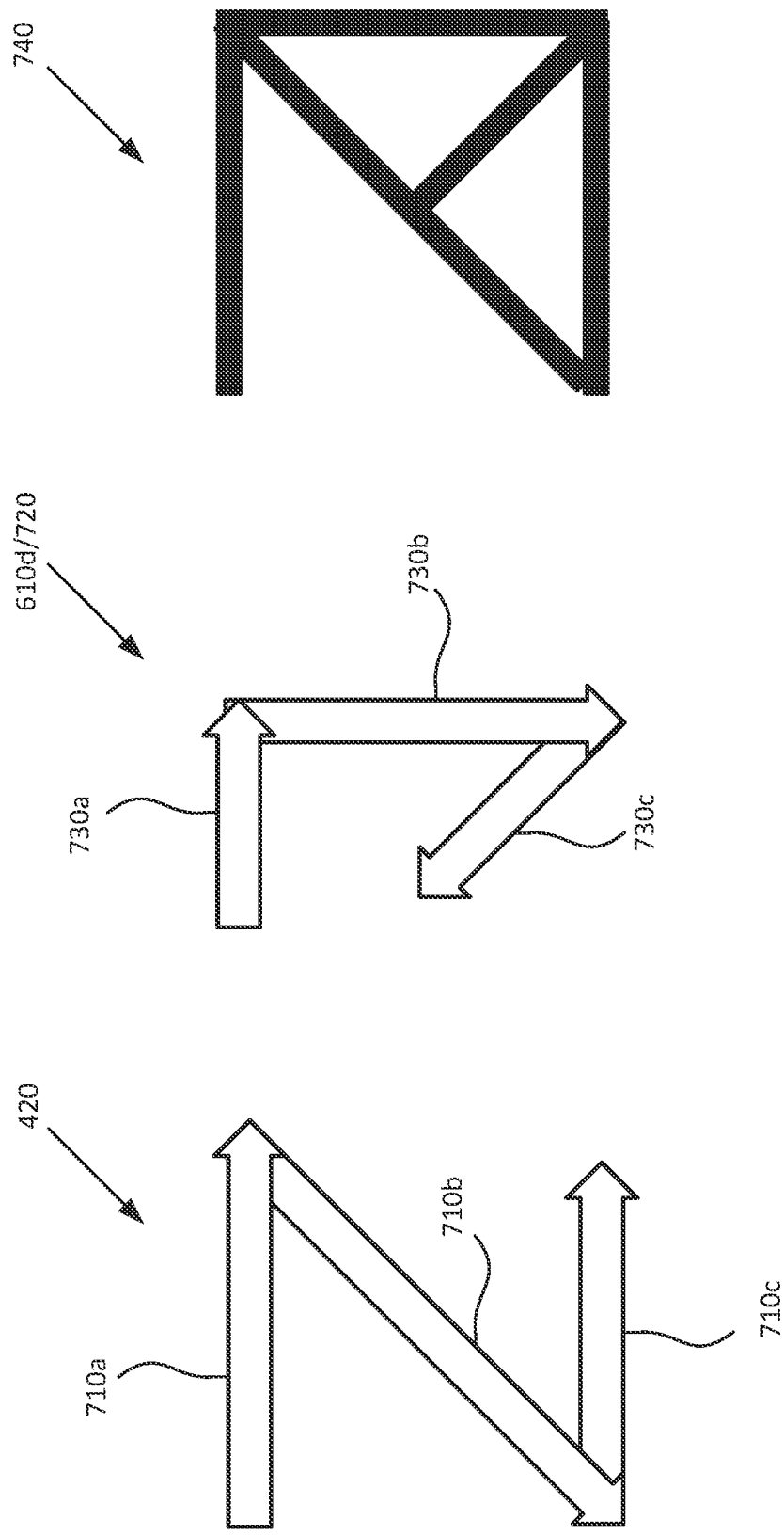
FIGS. 7A and 7B illustrate the application of various bait codes to a security pattern type access code, according to embodiments of the present disclosure.
Figure 7B:
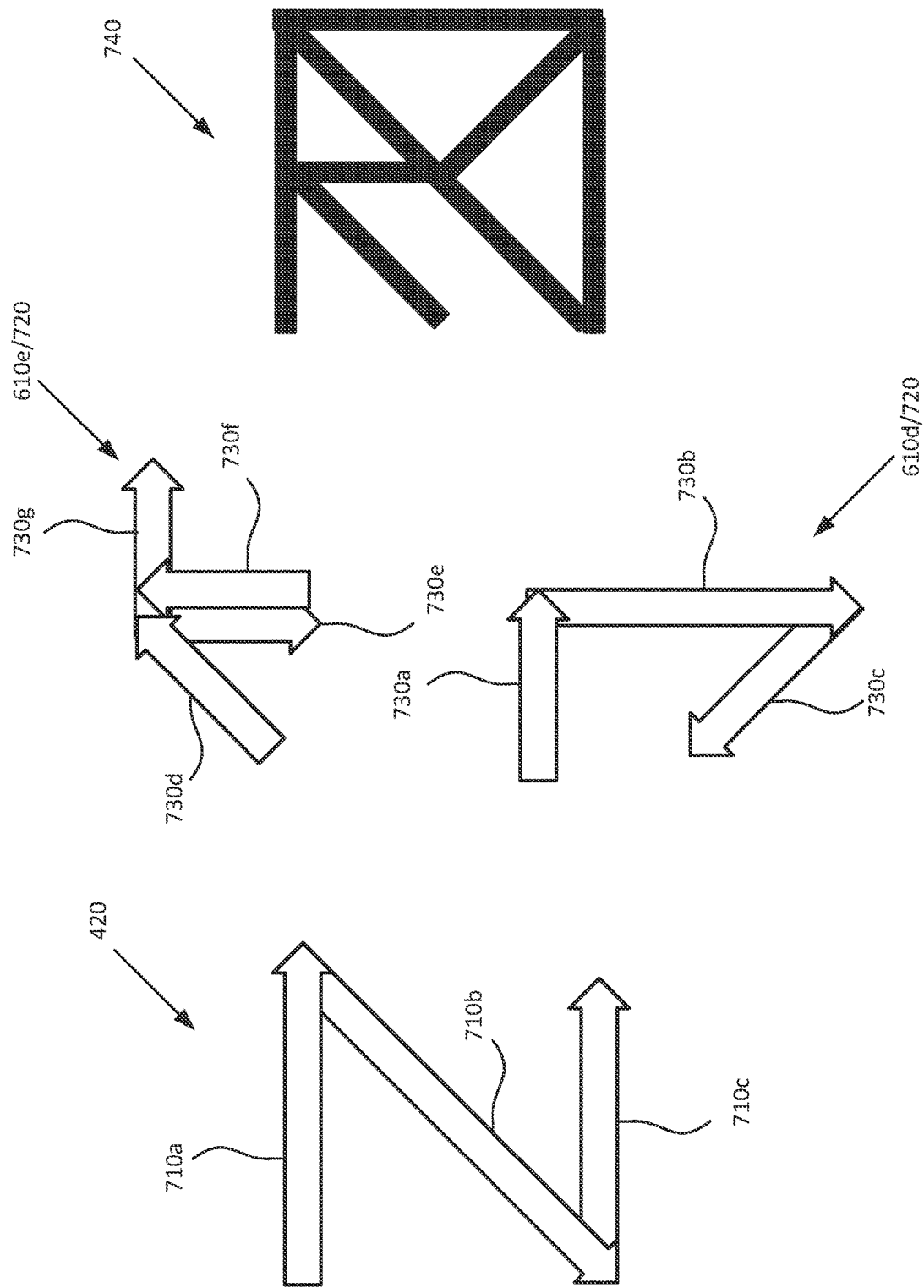

FIGS. 7A and 7B illustrate the application of various bait codes 610d-e to a security pattern type access code, according to embodiments of the present disclosure. FIGS. 7A and 7B may be understood in conjunction with FIG. 4B. A security pattern is composed of several actual strokes 710a-c (generally, strokes 710) that move from various points 430 on a touchscreen over various inter-point spaces 440 to form the security pattern 420. The input device 300 (or an associated computing device) generates a bait code 610 (as one bait code 610d as in FIG. 7A or as multiple, such as bait code 610d and bait code 610e in FIG. 7B) of a simulated security code 720, which includes one or more simulated strokes 730a-g (generally, simulated strokes 730) that mimic the heat pattern of an actual access code. In various embodiments, the simulated security code 720 is generated to include similar directions for the simulated strokes 730 to the actual strokes 710; to have simulated strokes 730 start at, pass through, or end at the same or adjacent points 430 as the actual strokes 710; to include a same or similar number of simulated strokes 730 as the actual strokes 710, etc. Additionally, as a security pattern 420 is generally completed in a single motion (i.e., without lifting a finger or stylus from the touchscreen), the simulates strokes 730 are organized to ensure that the simulated strokes 730 define a coherent pattern that can be performed in a single stroke.

The input device 300 outputs the simulated strokes 730 via heating elements in a contact surface to produce the heat pattern of the bait code 610 aligned with the heat signature of the access code to produce an overlaid heat pattern 740 to protect against a thermal imaging device from identifying the access code from the thermal image thereof. The input device 300 may output one bait code 610d (as in FIG. 7A) or simultaneously output multiple bait codes 610d-e (as in FIG. 7B) for one input code to result in a further obfuscating overlaid heat pattern 740.

The input device 300 outputs the heat pattern of the bait code(s) 610 aligned with the points 430 and inter-point spaces 440 over which the actual strokes 710 are entered on the input device. In various embodiments, the input device 300 generates and outputs the bait code(s) 610 while the user is inputting the security pattern, but may also wait until the security pattern is completely entered (whether accepted or rejected) before outputting the bait code(s) 610. In some embodiments, the input device 300 outputs the bait code 610 sequentially over a period of time while the user is attempting input of the access code so that if the malicious party observes partial input, the malicious party cannot determine whether the heat signature was made by the user or by the input device 300.

Figure 8:
FIG. 8 illustrates the application of an example bait code to a biometric pattern type access code, according to embodiments of the present disclosure.

FIG. 8 illustrates the application of an example sixth bait code 610f to a biometric pattern 450 type access code, according to embodiments of the present disclosure. FIG. 8 may be understood in conjunction with FIG. 4C. When a user applies an access code including a biometric pattern 450, the input device 300 (or associated computing device) generates a bait code 610 for the given type of biometric marker; sized, shaped, and oriented according to the biometric pattern 450 input by the user to mimic the heat pattern of an actual access code.

For example, when a user uses an authentic fingerprint 810 as the access code, the input device 300 generates a bait code 610 of a simulated fingerprint 820, but when the user uses a palm print as the access code, the input device 300 generates a bait code 610 of a simulated palm print. Similarly, when a first user uses a thumbprint as the access code, and a second user uses a pinky-fingerprint as the access code, the input device 300 generates a fingerprint bait code 610 sized and shaped as a thumbprint for the first user and a fingerprint bait code 610 size and shaped as a (smaller and narrower) pinky-fingerprint.

The input device 300 outputs the heat pattern of the bait code 610 aligned with the access code to produce an overlaid heat pattern 830 to protect against a thermal imaging device from identifying the access code from the thermal image thereof.

Figure 9:
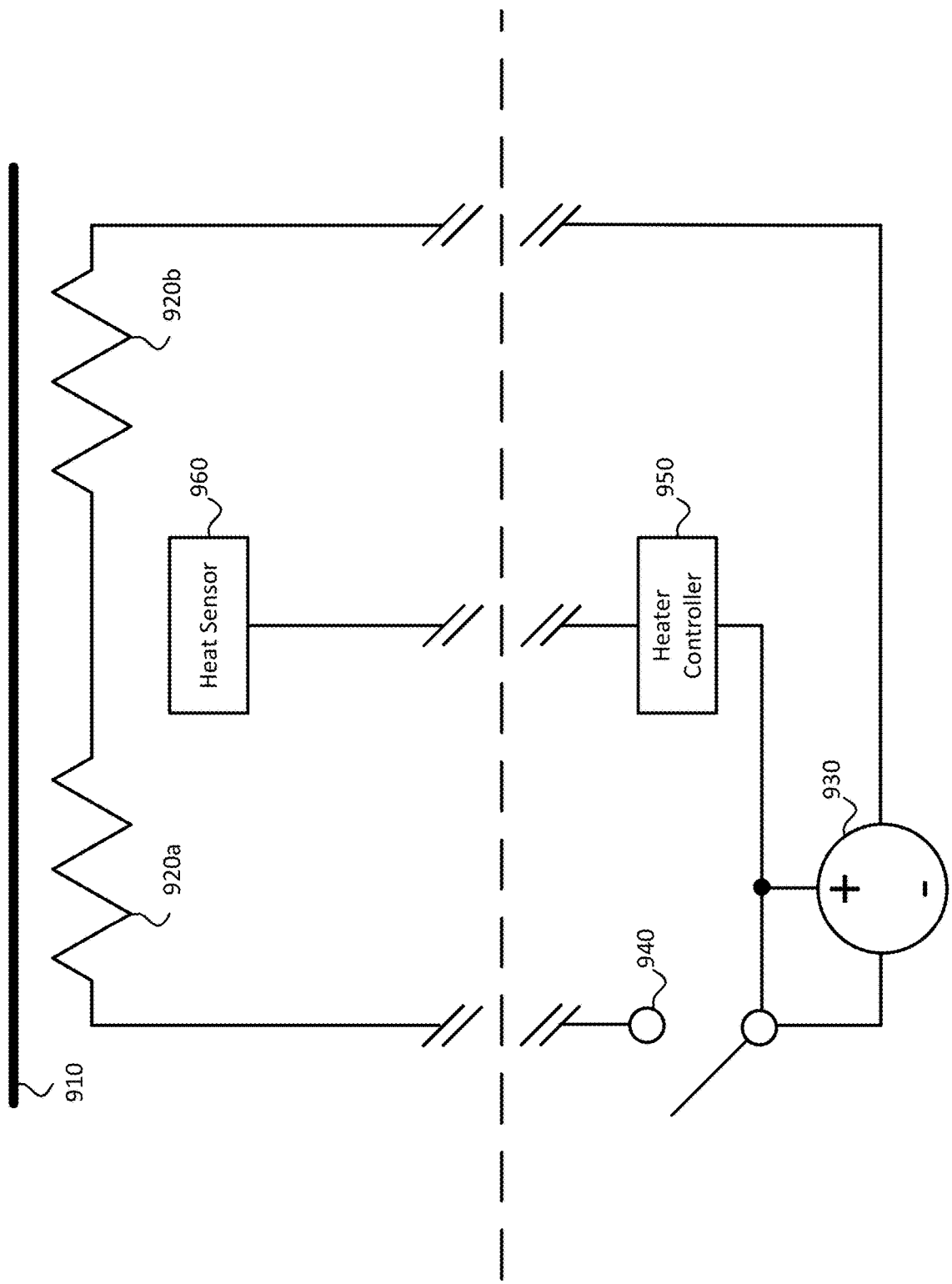
FIG. 9 illustrates an example heating element arrangement, according to embodiments of the present disclosure.

FIG. 9 illustrates an example circuit diagram 900 of the heating elements in relation to a contact surface 910. In various embodiments, the contact surface 910 includes the surfaces contacted by a user's finger whether those surfaces are buttons, keys, touchscreens, scanner surfaces for various input devices 300, or another portion of an input device 300 configured to receive an access code via touch input. The heat patterns of the bait codes 610 are applied and/or output to portions of the contact surface 910 via heating elements, such as resistors 920a, 920b (generally, resistor 920), which may be arranged in various configurations or arrays relative to the contact surface 910, a processor associated with of the input device 300, infrared Light Emitting Diodes (LEDs), resistor/inductor/capacitor arrays, and the like. The heating elements are disposed at various locations relative to the contact surface 910 to allow the heating elements to heat (or not heat) various portions of the contact surface 910 when outputting a bait code 610 to mimic the heat pattern of an actual or attempted entry of an access code.

The heating elements receive power from a power source 930, such a battery, Alternating Current (AC) power source, or Direct Current (DC) power source to control how much heat is output to the contact surface 910. In some embodiments, the power source 930 is selectively coupled to the heating elements via a switch 940 or other control mechanism controlled via a heater controller 950 to affect how much heat is output by the heating elements. In some embodiments, an output level of the power source 930 is controlled by the heater controller 950 to affect how much heat is output by the heating elements.

The heater controller 950 can be a computing device (including a processor and memory storage devices) included in the input device 300 or a computing device associated with the input device 300 (e.g., the computer associated with a given keyboard). The heater controller 950 determines which heating elements to activate, including when and whether to activate those heating elements, in conjunction with a bait code 610. The heater controller 950 is in communication with several heating elements, which may be configured to heat different portions of one contact surface 910 (e.g., coordinate $X_a$-$Y_a$ or $X_b$-$Y_b$ on a touchscreen) and/or different contact surfaces 910 of one input device 300 (e.g., the X key and the Y key on a keyboard). The heater controller 950 can detect input of an access code on the contact surface 910, identify the sequence (e.g., key sequence 410, security pattern 420, biometric pattern 450) that makes up the access code, and generate a bait code 610 based on the identified sequence, which is output to the contact surface(s) 910 via the heating elements that the heater controller 950 is in communication with.

In various embodiments, a heat sensor 960, such as a thermistor or a plurality of thermistors, is in communication with the heater controller 950 to report a temperature of the contact surface 910 for controlling what level of heat to output from the heating elements. For example, the heater controller 950 may adjust a heat level output from the heating elements based on a reported heat from the heat sensor 960 to match the heat imparted by a user to the contact surface 910 (e.g., providing a lower heat output for a user whose fingers are colder and transfer less heat than for a user whose fingers are warmer and transfer more heat). In various embodiments, a plurality of heat sensors 960 are disposed at various locations on the input device 300, and are associated with given heating elements of the plurality of heating elements. The heat sensors 960 measure temperatures of the contact surface 910 at a plurality of locations across the input device 300 and enable the heater controller 950 to correlate input access code sequences with the temperatures at those locations. For example, a heater controller 950 can identify the temperature at the key associated with the "1" character as being part of an access code input attempt, and determine the temperature on the contact surface of that key (via the heat sensor(s) 960 associated therewith) to thereby adjust a heat level in outputting a bait code 610. Thereby, if the "Q" key is selected as the portion of the bait code 610 to mimic the "1" key from the actual user input, the heater controller 950 can use the temperature measured at the "1" key to determine the temperature to output at the "Q" key. The heater controller 950 thereby controls the heating elements to output a heat signature 620 at a temperature level that closely matches the heat signature of the user input sequence.

Figure 10:
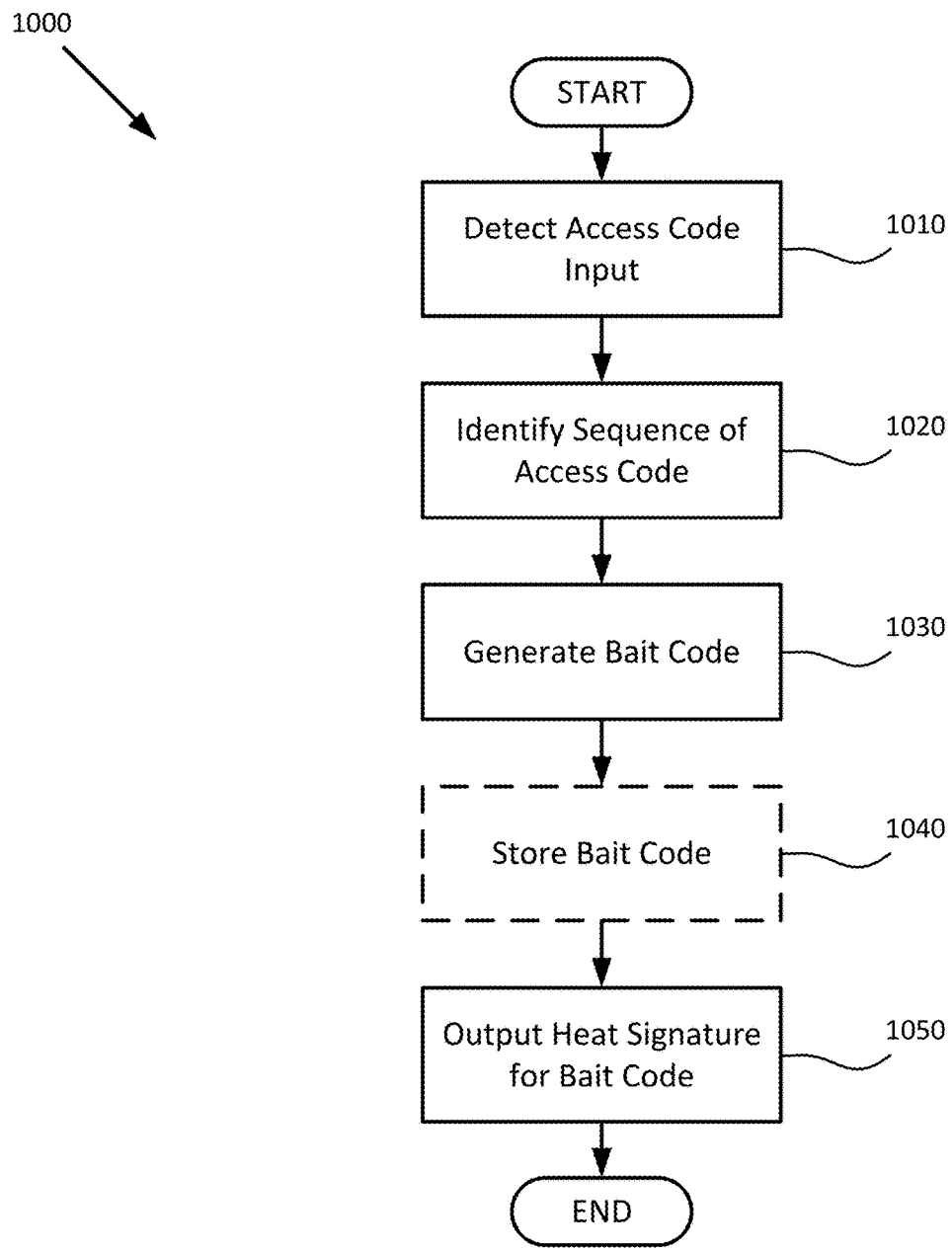
FIG. 10 is a flowchart of a method for securing against thermal imaging, according to embodiments of the present disclosure

FIG. 10 is a flowchart of a method 1000 for securing against thermal imaging, according to embodiments of the present disclosure. Method 1000 begins with block 1010, where an input device 300 detects that a user is attempting to input an access code. In various embodiments, the attempts to input the access code can be detected while input is ongoing or on completion of input, and can include proper inputs (i.e., the sequence that is entered matches a known access code), improper inputs (i.e., the sequence that is entered does not match a known access code), and malicious inputs (i.e., the sequence that is entered matches a known bait code 610). In various embodiments, detection of attempted input of an access code can vary depending on the input device 300. For example, a keypad style input device 300 associated with an electronic lock can detect attempted input of an access code in response to detecting a button being pushed, whereas a keyboard style input device 300 associated with a laptop computer can detect attempted input of an access code in response to a detecting an input key 310 being pushed while a software programming running on the laptop computer assigns focus to a password field. How the underlying access controlled system reacts to different input types is discussed in greater detail in regard to FIG. 11, and the input device 300 can output a bait code 610 regardless of whether the user gains or is denied entry to the underlying access controlled system.

At block 1020, the input device 300 identifies a sequence that comprises the access code input per block 1010. In various embodiments, the input device 300 may determine the sequence while the sequence is being input by the user, or may wait until the user completes input of the sequence to determine the sequence. For example, when the input device 300 is a keypad or keyboard receiving input to individual input keys 310, each key selection or button actuation by a user is identified as part of the sequence. In another example, when the input device 300 incudes a touchscreen, the input device 300 may delay identification of the sequence until a user completes an actual stroke 710 or breaks contact with the touchscreen. In another example, when the input device 300 includes a biometric scanner, the input device 300 delays identification of the sequence until the scan of the biometric pattern 450 is complete.

In various embodiments, identifying the sequence of inputs also includes measuring the temperatures on the contact surface(s) 910 used to make those inputs. For example, heat sensors 960 disposed on the portions of the contact surfaces 910 touched by a user when attempting to input an access code can report the temperatures imparted by the user to those contact surfaces 910 so that the temperature levels used to output the bait code 610 are adjusted to be within a predefined range of the heat signature left behind by the user's contact with the input device 300. In some embodiments, the temperature measurements of the contact surfaces 910 are used to generate a heat signature 620 that is hotter than the heat signature left behind by the user's contact with the input device 300 to further disguise the actual inputs as previous inputs or otherwise encourage the malicious party to misidentify the bait code 610 as the access code.

At block 1030, the input device 300 (or an associated computing device) generates a bait code 610 based on the identified input sequence. The bait code 610 is generated based on the type of input device 300 and how the user made contact with the input device 300 in inputting the sequence. For example, when the input device 300 includes a keypad, and the sequence includes a series of key selections, the bait code 610 is generated to include a different series of key selections (which may include one or more key selections shared with the entered series of key selections). In a further example, when the input device 300 includes a touchscreen, and the sequence includes a first security pattern, and the bait code 610 is generated to include a different security pattern (which may include simulated strokes 730 that pass through the same points 430 or inter-point spaces 440). In a further example, when the input device includes a biometric scanner, and the sequence includes a first biometric pattern 450, and the bait code 610 is generated to include a simulated biometric marker for the same type of biometric feature that is different from the input biometric pattern 450.

In various embodiments, when the input device 300 includes modifier keys 320, the input device 300 can optionally ignore inputs to the modifier keys 320 when identifying the sequence and generating a corresponding bait code 610. For example, when a user inputs the access code of "CaT", the sequence of inputs may include selection of modifier keys 320 (e.g. left shift, right shift, or caps lock keys) to capitalize the "C" and the "T". The input device 300 may ignore input to the modifier keys 320 to identify the sequence as "c-a-t" (i.e., identifying the sequence only from the input keys 310) or identify the sequence as "(left shift+c)-a-(right shift+t)" when including the modifier keys 320 in the sequence. As the modifier keys 320 provide additional security for the input keys 310 (e.g., a malicious party may not know which input key 310 is affected by a modifier key 320 via thermal imaging). In some embodiments, the inclusion or selection of a modifier key 320 as part of the sequence can be ignored when generating the bait code 610 so that no portion of the bait code 610 is applied to the modifier keys 320 (i.e., the bait code 610 excludes simulated inputs to the modifier keys 320). In other embodiments, the bait code 610 includes randomly simulated inputs to modifier keys 320, which can be inserted into the bait code 610 independently of whether a user selected a modifier key 320 (e.g., an input of "d-o-g" can have a bait code 610 of "f-(left shift+i)-b"). In some embodiments, the input device 300 applies a wash pattern to some or all of the modifier keys 320 while applying a second bait code 610 to the input keys 310 that is based on the sequence of inputs received from a user.

At block 1040, the input device 300 (optionally) stores the bait code 610 for further use. In various embodiments, the input device 300 stores the bait code 610 locally, on an associated computing device, and/or remotely in the cloud to detect a malicious party attempting to use the bait code 610 on the input device 300 or another device. The bait code 610 may be stored with a timestamp of when the bait code 610 was generated, and may expire (e.g., be deleted or removed from storage) after a predefined period of time expires or in response to receiving a new bait code 610. In various embodiments, after receiving input of a bait code 610, the storage of the bait code 610 is made permanent so that the bait code 610 does not expire or is not allowed to be replaced until manually cleared by an administrative user, so that additional access attempts from the malicious party using the bait code 610 can be observed and tracked.

For example, a malicious party may observe a user logging into a secure online account on the user's computing device by thermally imaging the keyboard used to input a password, but may attempt to gain unauthorized access to that secure online account on a different computing device. If the malicious party supplies the bait code 610 to the login portal for the secure online account, the login portal may compare the input from the malicious party against a stored bait code 610 (e.g., in a cloud storage or on a computing device associated with the online account) to determine whether to merely deny access for providing an incorrect access code or perform various unauthorized access countermeasures.

In another example, an input device 300 may store a bait code 610 for reuse when the access code is input again, to discourage statistical analysis of the obfuscated heat signature 630 over a period of time. For example, if a malicious party sets up a hidden thermal imager to view entry of an access code over a period of days, if the bait code 610 changes every time the access code is entered on the input device 300, the malicious party may identify the most commonly "hot" portions of the contact surface 910 to help isolate the access code. Instead, by reusing the bait code 610, or cycling through one of several bait codes 610 for reuse, the input device 300 can disrupt statistical analysis of the obfuscated heat signatures 630 as several portions of the contact surface 910 are repeatedly identifiable as "hot" or otherwise frequently entered.

At block 1050 the input device 300 outputs a heat signature 620 corresponding to the bait code 610 via the heating elements to obfuscate the heat pattern imparted by the user when attempting to input the access code. In various embodiments, the heat level applied by the heating elements is adjusted based on the heat levels imparted by the user (e.g., matching the imparted heat levels, exceeding the imparted heat levels) as measured by various heat sensors 960 associated with the contact surface(s) 910 that the user interacted with. In various embodiments, the bait code 610 is output while input of the sequence is still ongoing (e.g., after a first button is pushed by a user, a first element of the bait code 610 is output before or while the user pushes a second button), while in other embodiments, the input device 300 delays outputting the bait code 610 until entry of the sequence is complete.

In various embodiments, the input device 300 may generate multiple bait codes 610 based on a given sequence. For example, when the user inputs the access code at a first time, the input device 300 may output a first bait code 610a, but when the user inputs the access code at a second time, the input device 300 may output a second bait code 610b. In another example, when the user inputs the access code at one time, the input device 300 may output a first bait code 610a and a second bait code 610b at the same time. In a further example, when a user attempts to reenter an access code within a given time from a previous entry (e.g., due to an initial miss-entry, frequent access requests, etc.) the input device 300 may output a wash pattern to reduce the ability of a malicious part from using statistical analysis to decipher the actual access code from the bait codes 610.

Figure 11:
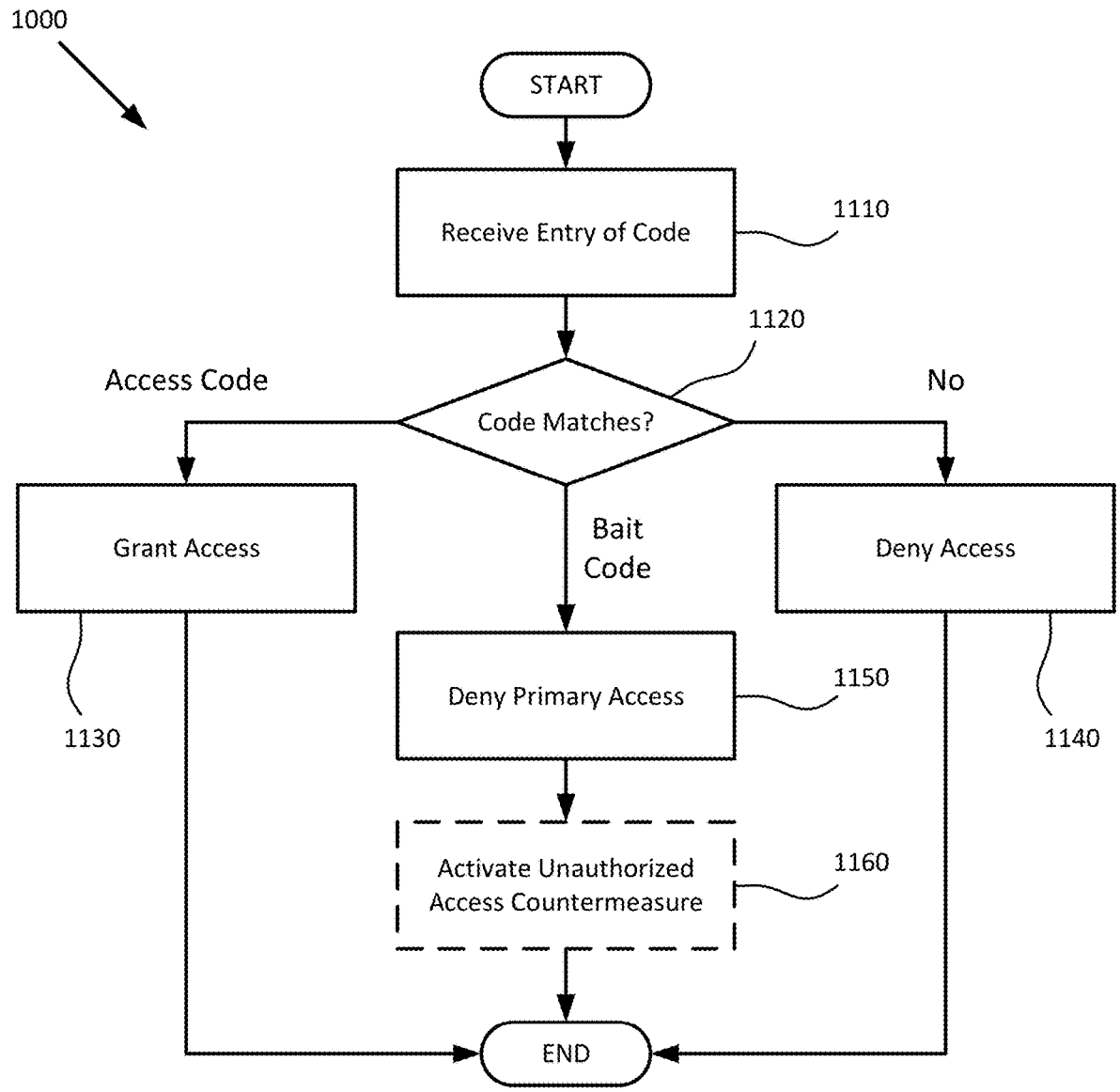
FIG. 11 is a flowchart of a method for managing access and security according to embodiments of the present disclosure.

FIG. 11 is a flowchart of a method 1100 for managing access and security according to embodiments of the present disclosure. Method 1100 begins with block 1110 where a computing device receives a completed entry of a code. For example, a user may select a fourth button on an input device 300 configured to automatically complete entry after a fourth input is received, a user may select a "login" or "enter" button (software-defined or physical) to indicate completion of entry, a user may break contact with a touchscreen, or a scan performed by the input device 300 may complete (e.g., a biometric scanner indicates that an image of the biometric feature 450 has been captured).

At block 1120, in response to receiving the code input per block 1110, the computing device determines whether the code matches a known access code, a known bait code, or no known code. In some embodiments, entry of the code received in block 1110 is be accompanied with an output of a bait code 610 (e.g., per method 1000 described in relation to FIG. 10) regardless of how the code is classified in block 1120 so that the "correctness" of the supplied code is not indicated by the presence or absence of additional heat patterns on the input device 300. In other embodiments, entry of the code received in block 1110 is not accompanied with an output of a bait code 610, such as, for example, when a malicious party observed a bait code 610 on a first input device 300 and is attempting to gain unauthorized access on a second input device 300 that is not configured to generate and output a bait code 610.

In response to determining per block 1120 that the code input per block 1110 matches a known access code, method 1100 proceeds to block 1130. At block 1130, the computing device grants access to the user for supplying the correct access code. In various embodiments, the computing device may query the user for additional information (e.g., two-factor authentication), prompt the user to update a password, etc., before fully granting access to the user. Method 1100 may then conclude.

In response to determining per block 1120 that the code input per block 1110 matches no known code, method 1100 proceeds to block 1140. At block 1140, the computing device denies access to the user. For example, the user may have mistyped a password, input an old security code, used the wrong finger, etc. In various embodiments, denying access may allow the user to reattempt to gain access, prompt the user for additional information (e.g., display a captcha, require two-factor authentication or answer to a security question, suggest a username/password lookup or reset, etc.), or lock the user out of the controlled system for a predefined period of time or until an administrative user unlocks access. Method 1100 may then conclude.

In response to determining per block 1120 that the code input per block 1110 matches a known bait code 610, method 1100 proceeds to block 1150. The bait code 110 may be a bait code 610 generated for an actual access code or an unknown code (e.g., a miss-entered access code), but is potentially indicative of a malicious party who observed the input device 300 via a thermal imager, and is attempting to gain unauthorized access to the controlled system.

At block 1150, the computing device denies primary access to the controlled system to the party who entered the bait code 610. In various embodiments, method 1100 may conclude after denying the party access to the controlled system. In other embodiments, method 1100 may proceed to block 1160 to activate one or more unauthorized access countermeasures before concluding.

In some embodiments, unauthorized access countermeasures include providing secondary access to the controlled system, such as, for example, a honeypot account (to observe the party's actions without exposing the user's actual data or actual access to the controlled system), a false loading or hardware error message (e.g., to delay the party or convince the party that access cannot be gained at the present time), and/or requesting additional information from the party (e.g., a false two-factor authentication setup to gain additional information on the Party).

In some embodiments, unauthorized access counter measures include activating a camera or audio recorder associated with the input device 300 (or associated computing device) that received the bait code 610 to gain additional information about the party attempting to gain access. In some embodiments, unauthorized access counter measures include generating a security alert to the authorized user of attempted unauthorized access or to an administrative user (e.g., a warning and suggestion to update an access code, a location or additional information on the party attempting unauthorized access to aid in apprehension).

Figure 12:
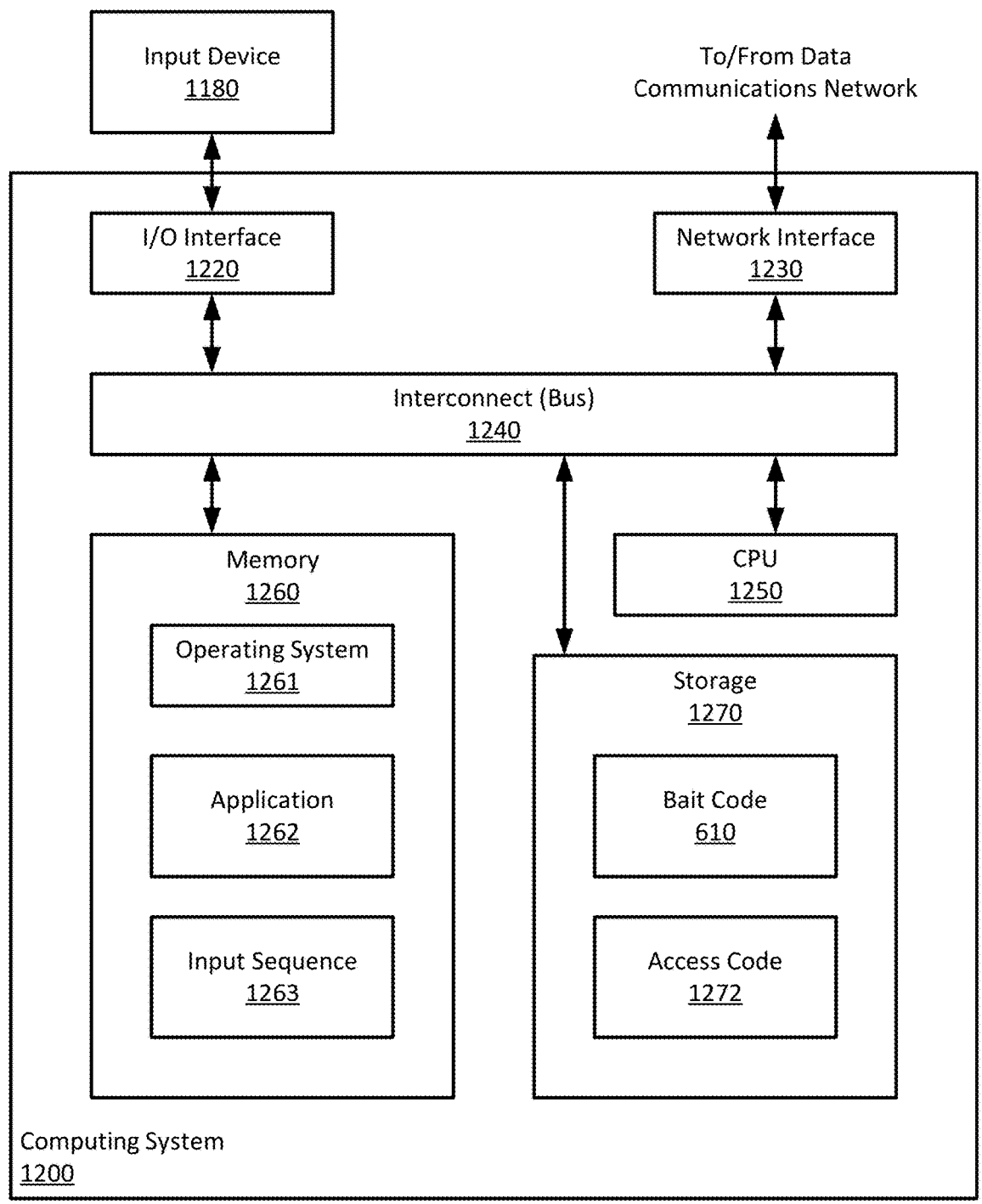
FIG. 12 illustrates a computing system, according to embodiments of the present disclosure.

FIG. 12 illustrates a computing system 1200, such as may be used in conjunction with or as an input device 300, according to embodiments of the present disclosure. As shown, the computing system 1200 includes, without limitation, a central processing unit (CPU) 1250, a network interface 1230, an interconnect 1240, a memory 1260, and storage 1270. The computing system 1200 may also include an I/O device interface 520 connecting I/O devices 1210 (e.g., keyboard, keypad, display, touchscreen, biometric scanner, and mouse devices) to the computing system 1200.

The CPU 1250 retrieves and executes programming instructions stored in the memory 1260. Similarly, the CPU 1250 stores and retrieves application data residing in the memory 1260. The interconnect 1240 facilitates transmission, such as of programming instructions and application data, between the CPU 1250, I/O device interface 1220, storage 1270, network interface or other interconnect 1240, and memory 1260. CPU 1250 is included to be representative of a single CPU, a microprocessor, multiple CPUs, a single CPU having multiple processing cores, and the like. And the memory 1260 is generally included to be representative of a random access memory. The storage 1270 may be a disk drive storage device. Although shown as a single unit, the storage 1270 may be a combination of fixed and/or removable storage devices, such as magnetic disk drives, flash drives, removable memory cards or optical storage, network attached storage (NAS), or a storage area-network (SAN). The storage 1270 may include both local storage devices and remote storage devices accessible via the network interface 1230 (e.g., cloud storage).

Further, although shown as a single computing system, one of ordinary skill in the art will recognized that the components of the computing system 1200 shown in FIG. 12 may be distributed across multiple computing systems connected by a data communications network.

As illustrated, the memory 1260 includes an operating system 1261, which may include one or more file systems, and a set of processor instructions to perform various actions as described herein. These actions may be informed and formatted according to various applications 1262 running in the memory as instructions executed by the CPU 1250. The memory 1260 can store the input sequence 1263 temporarily for comparison against an access code 1272 held in the storage 1270 to determine whether a user is to be granted to denied access to the operating system 1261 or another application 1262 running on the computing system 1200. In some embodiments, the bait code 610 that is output to the input device to obfuscate the input sequence 1263 is also held in the storage 1270 (or in the memory 1260) for at least a predefined time period to protect against a malicious party from attempting to gain access to the computing system 1200 by entering the bait code 610 and responding with an unauthorized access countermeasure in addition to or instead of denying access to the computing system 1200.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present disclosure, reference is made to embodiments presented herein. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising, in response to detecting input of an access code on an input device:
identifying a first sequence comprising the access code;
generating a first bait code of a shared type with the access code of one of a key sequence, a security pattern, and a biometric pattern, the first bait code having a second sequence different from the first sequence; and
outputting a first heat signature corresponding to the first bait code using heating elements included in the input device.

2. The method of claim 1, wherein the heating elements include resistor arrays arranged with contact surfaces of the input device.

3. The method of claim 1, further comprising:
measuring temperatures of contact surfaces of the input device where the access code has been input; and
wherein outputting the first heat signature via the heating elements further comprises: adjusting a heat level of the heating elements based on the temperatures measured.

4. The method of claim 1, wherein the input device includes a keypad, wherein the first sequence includes a first series of key selections, and wherein the first bait code includes a second series of key selections different from the first series of key selections.

5. The method of claim 4, wherein the first series of key selections includes at least one key selection shared with the second series of key selections.

6. The method of claim 4, wherein a given key selected to comprise the second series of key selections is selected at least in part based on a distance of a corresponding key of the first series of key selections on the keypad related to the given key.

7. The method of claim 1, wherein the input device includes a touchscreen, wherein the first sequence includes a first security pattern, and wherein the first bait code includes a second security pattern different from the first security pattern.

8. The method of claim 1, wherein the input device includes a fingerprint scanner, wherein the first sequence includes a first fingerprint, and wherein the first bait code includes a second fingerprint different from the first fingerprint.

9. The method of claim 1, further comprising:
storing the first bait code for a predefined amount of time; and
in response to receiving entry of the first bait code, activating an unauthorized access countermeasure.

10. The method of claim 9, wherein the unauthorized access countermeasure includes at least one of:
granting access to a honeypot account;
activating a camera associated with the input device; and
transmitting a security alert.

11. The method of claim 1, further comprising, in response to detecting subsequent input of the access code on the input device:
generating a second bait code, wherein the second bait code is of the shared type with the access code and has a third sequence different from the first sequence of the access code and different from the second sequence of the first bait code; and
activating the heating elements included in the input device based on the second bait code.

12. The method of claim 1, wherein the first sequence is received over a period of time, wherein the first heat signature is output in response to the period of time concluding, and wherein the heating elements output multiple different heat levels based on the first sequence and the period of time.

13. The method of claim 1, wherein the first sequence is received over a period of time, wherein outputting the first heat signature sequentially activates the heating elements during the period of time.

14. The method of claim 1, wherein the first bait code is a wash pattern applied to all of the heating elements of the input device.

15. The method of claim 1, wherein the first sequence includes inputs to a modifier key and the first bait code excludes corresponding simulated inputs to the modifier key.

16. The method of claim 1, further comprising:
generating a second bait code based on the first sequence, the second bait code having a third sequence different from the first sequence and different from the second sequence; and outputting a second heat signature corresponding to the second bait code via the heating elements included in the input device concurrently with outputting the first heat signature.

17. A system, comprising:
a contact surface;
a plurality of heating elements disposed at a first plurality of locations relative to the contact surface; and
a heater controller, including:
  a processor; and
  a memory storage device including instructions that when executed by the processor, enable the heater controller to:
    detect input of an access code on the contact surface;
    identify a first sequence comprising the access code;
    generate a bait code having a second sequence that is different from the first sequence, wherein the first sequence and the second sequence are both one of a biometric pattern, a security pattern, and a key sequence; and
    output a heat signature corresponding to the bait code to the contact surface via the plurality of heating elements.

18. The system of claim 17, further comprising:
a plurality of thermistors disposed at a second plurality of locations relative to the contact surface; and
wherein the instructions, when executed by the processor, further enable the heater controller to:
  measure temperatures of the contact surface at the second plurality of locations;
  correlate input of the first sequence to a subset of the second plurality of locations; and
  adjust a heat level of the plurality of heating elements based on the temperatures measured and correlated to the subset of the second plurality of locations.

19. The system of claim 17, wherein the contact surface includes at least one of:
  a button face;
  a touchscreen; and
  a fingerprint scanner; and
wherein the first sequence includes at least one of:
  a series of button actuations comprising the key sequence;
  series of strokes comprising the security pattern; and
  a fingerprint comprising the biometric pattern.

20. A non-transitory computer-readable storage medium having computer-readable program code embodied therewith, the computer-readable program code executable by one or more computer processors to:
  detect input of an access code on an input device;
  identify a first sequence comprising the access code;
  generate a bait code of a shared type with the access code of one of a key sequence, a security pattern, and a biometric pattern, wherein the bait code has a second sequence different from the first sequence; and'
  output a heat signature corresponding to the bait code via heating elements included in the input device.

* * * * *